US011761847B2

(12) United States Patent
Winant et al.

(10) Patent No.: US 11,761,847 B2
(45) Date of Patent: Sep. 19, 2023

(54) SYSTEM AND METHOD FOR DETERMINING THE RISK OF FAILURE OF A STRUCTURE

(71) Applicants: Thomas Arthur Winant, Chester, NJ (US); Alan Peter Jeary, Jersey City, NJ (US)

(72) Inventors: Thomas Arthur Winant, Chester, NJ (US); Alan Peter Jeary, Jersey City, NJ (US)

( * ) Notice: Subject to any disclaimer, the term of this patent is extended or adjusted under 35 U.S.C. 154(b) by 31 days.

(21) Appl. No.: 17/181,745

(22) Filed: Feb. 22, 2021

(65) Prior Publication Data

US 2021/0247265 A1 Aug. 12, 2021

Related U.S. Application Data

(63) Continuation-in-part of application No. 15/629,694, filed on Jun. 21, 2017, now Pat. No. 10,928,271.

(60) Provisional application No. 62/493,055, filed on Jun. 21, 2016.

(51) Int. Cl.
*G01M 5/00* (2006.01)
(52) U.S. Cl.
CPC ........ *G01M 5/0041* (2013.01); *G01M 5/0008* (2013.01)
(58) Field of Classification Search
None
See application file for complete search history.

(56) References Cited

U.S. PATENT DOCUMENTS

| 4,901,575 | A | 2/1990 | Bohannan |
| 6,292,108 | B1 | 9/2001 | Straser |
| 7,228,240 | B2 | 6/2007 | Duron |
| 8,831,895 | B2 | 9/2014 | Hedl |
| 10,295,435 | B1 | 5/2019 | Wu |

(Continued)

FOREIGN PATENT DOCUMENTS

| JP | H05281082 A | 10/1993 |
| JP | 2016095180 A | 5/2016 |
| WO | 2012019022 A2 | 2/2012 |

OTHER PUBLICATIONS

Examination Report issued in Australian Patent Appln. No. 2017281204 dated Jul. 14, 2021.

(Continued)

*Primary Examiner* — Matthew G Marini
(74) *Attorney, Agent, or Firm* — ROSSI, KIMMS & McDOWELL LLP

(57) ABSTRACT

A system and method for measuring dynamic properties of a structure, and for using the measured dynamic properties to assess the dynamic performance of the structure. The system and method can separate the measured response into low amplitude and high amplitude data to reduce the influence of outside forces and mass. The system and method measures dynamic properties of the structure such as frequencies of resonance, mode shapes, and non-linear damping, and uses them in an analysis of the structure to compare the dynamic response of the structure with the anticipated properties of a structure built according to applicable building code requirements. The system and method thus quantifies a risk of failure of the structure by determining a risk ratio that compares an as-is condition of the structure with an as-designed condition of the structure.

25 Claims, 31 Drawing Sheets

(56) References Cited

U.S. PATENT DOCUMENTS

| | | | |
|---|---|---|---|
| 2005/0125197 A1 | 6/2005 | Duron | |
| 2005/0165588 A1 | 7/2005 | Iwan | |
| 2011/0046929 A1 | 2/2011 | Bryant | |
| 2013/0130734 A1 | 5/2013 | Rice | |
| 2014/0324356 A1 | 10/2014 | Park | |
| 2014/0358592 A1 | 12/2014 | Wedig | |
| 2015/0355050 A1 | 12/2015 | Yoshida | |
| 2016/0084961 A1 | 3/2016 | Morishita | |
| 2016/0091397 A1 | 3/2016 | Shinkle | |
| 2017/0363504 A1 | 12/2017 | Winant | |
| 2018/0136085 A1* | 5/2018 | Lochry | G01M 5/0091 |

OTHER PUBLICATIONS

Supplementary European Search Report issued in European Application No. 17816174.1 dated Feb. 7, 2020.

Extended European Search Report issued in European Appln. No. 17816174.1 dated Jan. 21, 2020.

Li. "Damage detection of bridge beam subjected to moving loads based on energy ration from vibration response." 2015 Sixth International Conference on Intelligent Systems Design and Engineering Applications. 978-1-14673-9393-5/5/15 $31.00 © 2015 IEEE. DOI 10.1109/ISDEA.2015.73 (Year: 2015).

Spence. "Tall Buildings and Damping: A Concept-Based Data-Driven Model." Journal of Structural Engineering. May 2014. vol. 140, Issue 5.

International Search Report issued in Intl. Appln. No. PCT/US2017/038621 dated Oct. 26, 2017.

Written Opinion issued in Intl. Appln. No. PCT/US2017/038621 dated Oct. 26, 2017.

Sakaue. "Structural Health Monitoring System Using MEMS-Applied Vibration Sensor." Fuji Electric Review. 2014. vol. 60, No. 1.

Office Action issued in U.S. Appl. No. 15/629,694 dated Feb. 15, 2019.

Office Action issued in U.S. Appl. No. 15/629,694 dated Nov. 1, 2019.

Office Action issued in U.S. Appl. No. 15/629,694 dated May 7, 2020.

Notice of Allowance issued in U.S. Appl. No. 15/629,694 dated Oct. 21, 2020.

Examination Report issued in Indian Patent Appln. No. 201947002366 dated Sep. 7, 2021.

International Search Report issued in Intl. Appln. No. PCT/US2022/015766 dated May 20, 2022.

Written Opinion issued in Intl. Appln. No. PCT/US2022/015766 dated May 20, 2022.

Ntent to Grant issued in European Appln. No. 17816174.1 dated Feb. 10, 2022.

* cited by examiner

| TIME | SENSOR #1 | SENSOR #2 | SENSOR #3 | SENSOR #4 |
|---|---|---|---|---|
| 8:00 – 8:30 | R1 | R2 | T3-1 | T4 – 1 |
| 8:30 – 9:00 | R1 | R2 | T3-2 | T4 – 2 |
| 9:30 – 10:00 | R1 | R2 | T3-3 | T4 – 3 |
| 10:30 – 11:00 | R1 | R2 | T3-4 | T4 – 4 |
| 11:00 – 11:30 | R1 | R2 | T3-5 | T4 – 5 |
| 11:30 – 12:00 | R1 | R2 | T3-6 | T4 – 6 |
| 12:00 – 12:30 | R1 | R2 | T3-7 | T4 – 7 |
| 12:30 – 1:00 | R1 | R2 | T3-8 | T4 – 8 |
| 1:00 – 1:30 | R1 | R2 | T3-9 | T4 – 9 |
| 1:30 – 2:00 | R1 | R2 | T3-10 | T4 – 10 |

FIG.2

|   | A | B | C | D | E |
|---|---|---|---|---|---|
| 1 | TIMESTAMP | X-AXIS (g) | Y-AXIS (g) | Z-AXIS (g) | VM (g) |
| 2 | 2016-02-01T10:23:52.461289 | 0.360348 | 0.053084 | -0.92583 | 0.994905 |
| 3 | 2016-02-01T10:23:52.461789 | 0.359665 | 0.048939 | -0.92601 | 0.99461 |
| 4 | 2016-02-01T10:23:52.462289 | 0.359927 | 0.047342 | -0.92602 | 0.994633 |
| 5 | 2016-02-01T10:23:52.462789 | 0.360218 | 0.04785 | -0.9259 | 0.994657 |
| 6 | 2016-02-01T10:23:52.463289 | 0.359776 | 0.048767 | -0.92595 | 0.99459 |
| 7 | 2016-02-01T10:23:52.463789 | 0.358756 | 0.049123 | -0.92595 | 0.994231 |
| 8 | 2016-02-01T10:23:52.464289 | 0.357268 | 0.049199 | -0.92422 | 0.992091 |
| 9 | 2016-02-01T10:23:52.464789 | 0.356358 | 0.049894 | -0.92255 | 0.990246 |
| 10 | 2016-02-01T10:23:52.465289 | 0.358741 | 0.051458 | -0.92794 | 0.996203 |
| 11 | 2016-02-01T10:23:52.465789 | 0.363635 | 0.052079 | -0.93718 | 1.006606 |
| 12 | 2016-02-01T10:23:52.466289 | 0.361389 | 0.049713 | -0.92705 | 0.99624 |
| 13 | 2016-02-01T10:23:52.466789 | 0.345857 | 0.047512 | -0.88954 | 0.955594 |
| 14 | 2016-02-01T10:23:52.467289 | 0.330317 | 0.052322 | -0.86534 | 0.927721 |
| 15 | 2016-02-01T10:23:52.467789 | 0.333435 | 0.064881 | -0.89668 | 0.958866 |
| 16 | 2016-02-01T10:23:52.468289 | 0.351559 | 0.07657 | -0.95981 | 1.02503 |

FIG.3

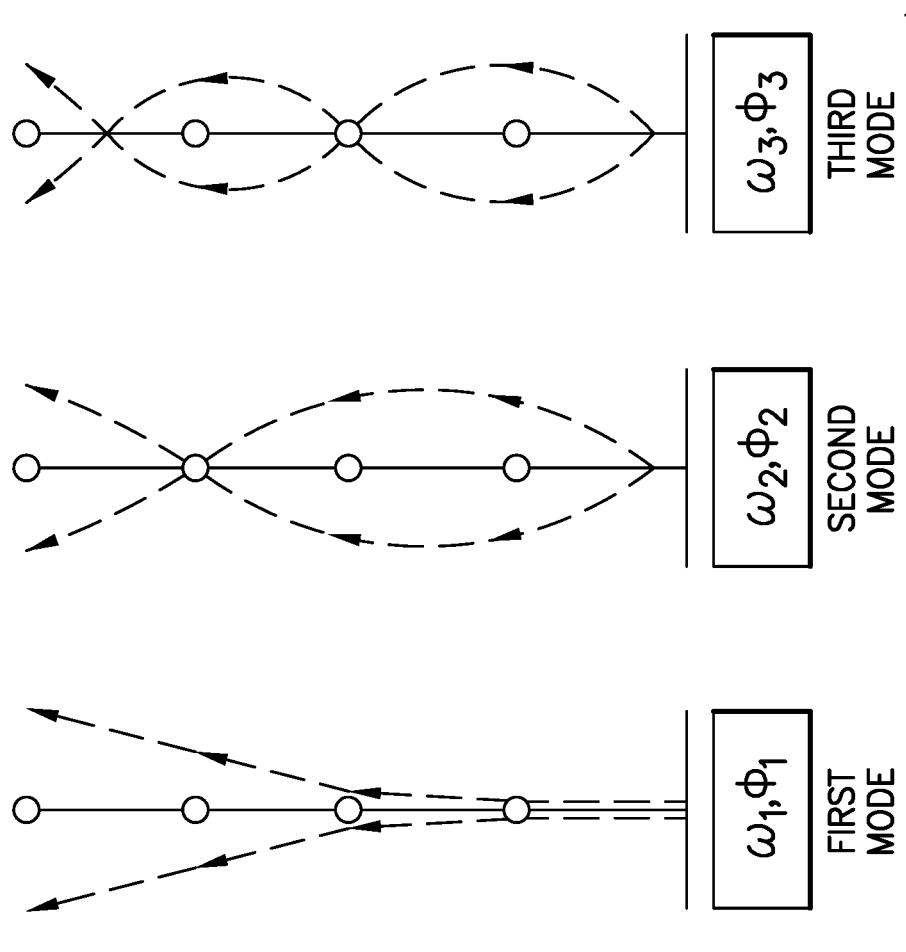

Bridge Span Modes
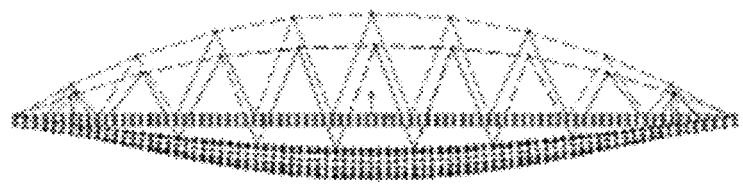
FIRST MODE
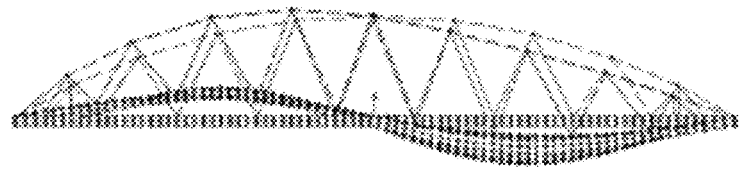
SECOND MODE
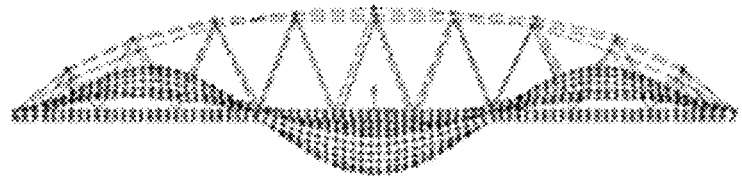
THIRD MODE
Figure 5 B

| POSITION | | A<br>SPECTRAL PEAK (g^2/Hz) AMP | B<br>SPECTRAL ACCELERATIONS (g) | C<br>DISPLACEMENT (mm) | D<br>NORMALIZED RATIO (SPECTRAL AMP) | E<br>NORMALIZED RATIO (DISPLACEMENT) |
|---|---|---|---|---|---|---|
| ROOF NE | MODE 1 | 1.00E−08 | 1.00E−04 | 5.38E−03 | 1.00 | 1.00 |
| ROOF NE | MODE 2 | 4.69E−09 | 6.85E−05 | 8.44E−04 | 0.35 | 0.59 |
| ROOF NW | MODE 1 | 6.04E−09 | 7.77E−05 | 4.18E−3 | 0.60 | 0.78 |
| ROOF NW | MODE 2 | 1.11E−08 | 1.05E−04 | 1.30E−03 | 0.82 | 0.91 |
| ROOF SE | MODE 1 | 1.00E−08 | 1.00E−04 | 5.38E−03 | 1.00 | 1.00 |
| ROOF SE | MODE 2 | 4.17E−09 | 6.46E−05 | 7.96E−04 | 0.31 | 0.56 |
| ROOF SW | MODE 1 | 6.18E−09 | 7.86E−05 | 4.23E−03 | 0.62 | 0.79 |
| ROOF SW | MODE 2 | 1.35E−08 | 1.16E−0.4 | 1.43E−03 | 1.00 | 1.00 |

$$\text{Displacement(mm)} = \sqrt{\text{Amp}\left(\frac{g^2}{Hz}\right) * \frac{9810\left(\frac{mm}{s^2}\right)}{(2\pi f)^2}}$$

$$\text{Normalized Ratio}_{\text{Displacement}} = \sqrt{\text{Normalized Ratio SpectralAmp}}$$

FIG.8

| EVALUATION OF STRUCTURAL RISK BASED OF LATERAL LOAD CAPACITY | | A EXPECTED | B MEASURED | C PERCENT OF EXPECTED | D *PERCENT OF DESIGNED STIFFNESS (%) | E RISK RATIO | F RETURN PERIOD | G PROBABILITY OF OCCURRENCE IN ANY YEAR |
|---|---|---|---|---|---|---|---|---|
| MEASURED TO EXPECTED | FREQUENCY (Hz) | 3.35 | 3.81 | 114% | 129% | 99% | 439.60 | 0.23% |
| | DAMPING (%) | 3.56 | 6.50 | 183% | | | | |

FIG.19

SYSTEM AND METHOD FOR DETERMINING THE RISK OF FAILURE OF A STRUCTURE

FIELD OF THE INVENTION

The present invention is directed to a system and method for determining the condition of a structure, such as a bridge, or other structure, and, more particularly, for quantifying the risk of failure of the structure.

BACKGROUND OF THE INVENTION

Significant research since the 1950's has been conducted on how structures behave dynamically and how to measure the dynamic response of structures. It is well established that structures move and flex in a series of modes of vibration. Each mode of vibration is described by a series of parameters that are dictated generally by physical properties of the structure including modal mass, modal stiffness, the deflected modal shape or mode shape, and damping. The mathematical representation of the dynamic response of a structure in a specific mode of vibration is a fundamental equation in the field of structural dynamics, and is provided as Equation 1, below.

$$X_r = \frac{F_r}{8 f_r^2 \zeta_r M_r \pi^2} \qquad \text{Equation 1}$$

Where for mode r: X is displacement
M is the modal mass;
f is the frequency of resonance of the structure;
F is the force experienced by the structure;
$\zeta_r$ is the damping of mode r.

Each deflected modal shape occurs at a specific vibrational frequency for a generally monolithic structure. The structure's stiffness is linearly related to frequency for monolithic structures through a range of amplitudes, known as the elastic range, where the structure is assumed to behave elastically and to not experience damage.

In Equation 1, the structure's dynamic response, $X_r$, may be calculated in any specific mode. However, to make an accurate calculation, the parameter of damping, $\zeta$, must be accurately determined to yield an accurate response calculation. Historically, the parameter of damping has been very difficult to measure accurately. Traditionally, a structure would need to be physically shaken either by large natural or manmade forces to provide the excitation needed to measure how the structure dissipates energy at various amplitudes. Since damping is a parameter that changes with amplitude, accurate measurements were rarely achieved. Due to the difficulties of accurately measuring damping, codes of practice for design and construction have typically used estimates for damping. This has become standard engineering design practice. Often these estimates were more conservative to allow for extra capacity in the design of a structure. This is a reasonable approach to help embed an additional safety factor and is almost universally adopted for building design. Since Equation 1 shows damping as a constant value, single-value estimates have traditionally been used. However, damping is an amplitude-dependent parameter and follows a predictable curve for structures which starts at a low amplitude level and continues to rise based on structural specific parameters to a higher level providing a predictor at high amplitude, if the low amplitude behavior is known. Making a measurement that includes many different amplitudes of response leads to measurements that are averaged at each amplitude which can be presented in an accurate amplitude dependent damping curve showing nonlinear changes. M, the modal mass is assumed to remain constant. However, when measuring the response of bridges when traffic is present, the modal mass will change as traffic crosses. This presents a challenge when a structure to be analyzed is a bridge. Therefore, the response of a structure can be accurately measured to show the nonlinear behavior. Practically, measuring the response is easily achieved at low amplitudes. This damping predictor allows for the ability to anticipate the damping response of a structure if only the low amplitude portion of the damping curve is measured.

The design process for structures, and the codes of practice that underwrite design norms around the globe, seeks to define the response of a structure to a force acting on it caused by an event, such as wind or seismic activity, or a force, such as traffic. The allowable deflection of a structure is dictated by building/construction codes using one of a number of different possible allowable deflections. Sometimes these are specified in terms of a demand to capacity ratio, sometimes as the end of the elastic limit, sometimes as a displacement per unit height (drift), or sometimes in terms of human comfort (serviceability, measured in acceleration). It is normal to consider both serviceability and strength requirements for a design. Both are well defined. The design process conventionally uses applied quasi-static forces. For a vertical structure (like a building or bridge decks) this is analogous to the fundamental mode of vibration.

The force for which a design must account is dictated by code or the designer and is normally defined by observing the history of events in the region of construction. For bridges it would be dictated by the expected traffic loading. For buildings, the probability of occurrence is defined by the code committee in some locations, and in others the code allows the designer to choose an acceptable risk. In either case the risk of occurrence of the event is easily defined. An example may be that a 10 story (120"/story) building may be allowed to deflect 2" laterally under a 100-mph wind, based on a 1/600 allowable deflection criteria.

Over the last 100 years, the global engineering community has been focused on building structures which can withstand damaging events to assure public safety and limit property damage. In the next 100 years, there will be a focus to maintain the built infrastructure for that same purpose. For built structures, their ability to withstand a damaging event as envisioned under building codes can be assessed by knowing the response of the structure to a damaging event (100 mph wind, seismic event, etc.), and the materials of which it is constructed. For bridges, they must resist the expected traffic which may increase as population continues to grow. As discussed, the response is measurable as dictated by Equation 1. Therefore, one can look at the measured response and compare it to the anticipated response under the code to see if the structure still has the same capacity to withstand the anticipated event. However, to conduct these real measurements during an extreme event is impractical and expensive, and therefore very rarely done. Yet, the actual measured response is a true indication of how the structure responds to a force acting upon it.

Structures may experience damage caused by aging and degradation as well as forces from natural and manmade impacts or events (e.g., construction, explosions, seismic, wind, collision, etc.). Current methods of assessing the condition of a building or other types of structures typically involve visually inspecting the structure, which is inherently subjective with a large portion of the structure concealed from view. Also, monitoring technologies that are standard in construction do not look at a structure's actual dynamic response, i.e., they evaluate only a structure's static response. Thus, visual inspections are often incomplete, and limited and monitoring technologies are antiquated and provide minimal information.

Evaluating the dynamic response of a structure is useful after the structure has experienced an event that could adversely affect the integrity and safety of the structure. Typically, such evaluating consists of merely determining whether the structure has been damaged, and possibly the extent of the damage. What is lacking is a system or method that will determine a risk of failure of a structure if that structure is exposed to an event for which the structure was designed and constructed to withstand.

SUMMARY OF THE INVENTION

Determining whether a structure is damaged following an event is of no value in determining the risk that the damaged structure will continue to function as it was designed and constructed. What is of value is knowing the performance of the structure prior to the damaging event, and the net change in its performance caused by the damage, as well as its minimal acceptable performance which could be the result of future damage. This provides value by determining the likelihood that a structure will fail after it is exposed to an event it was designed and constructed to withstand. This method provides an objective system to track structural performance limits from the beginning of a structure's life through the end of its useful life. This is especially true after a structure has been damaged, since current methods cannot accurately quantify the damage relating it to the structure's performance. The present invention does not use the conventional approach to post-event structural analysis, which merely assess the then-current condition of the structure, i.e., whether it is damaged and, if so, how damaged. As to the "how damaged" question, conventional systems and methods are generally imprecise, may rely on the experience of the assessor, and are unable to contextually quantify the extent of the damage since they do not employ an objective measurement of the structure's dynamic performance. Conventional methods and systems are thus flawed and inadequate. In contrast, the present invention measures the then-current condition of a structure and compares that measured condition with specification(s) to which the structure was built to produce a risk ratio that quantifies the risk of structural failure under certain conditions. As used herein, the term failure (and variations thereof) when used to describe the dynamic performance of a structure, refers to the dynamic performance of the structure taken outside the elastic range of the structure. Failure of a structure in this context will result in damage to the structure; specifically, damage prior to the point of collapse of the structure. Thus a structure may have not collapsed yet still be considered to have suffered a failure in the context of the present invention. It is understood in the art that the elastic range of a structure changes over time typically due to some form of damage, and that a partially damaged structure establishes a new elastic limit incorporating the previous damage. It is further understood in the art that it is undesirable for the dynamic performance of a structure to undergo a response displacement outside its elastic range which would cause more damage. The present invention not only detects the condition of a structure, it also determines and quantifies the likelihood of structural failure, providing an inventive step. Thus, the present invention is directed to a new and useful process utilizing mathematical algorithms for quantifying a risk of failure of a structure. Moreover, the present invention is directed to a system and method that are each other than what is well-understood, routine and conventional, as there is no system or method that performs the risk quantification, as does the present invention. In addition, the present invention is directed to a particular useful application and improvement in the field of structural analysis and assessment.

The present invention is directed to a system and method for measuring dynamic properties of a structure (e.g., buildings, bridges, dams, any monolithic structure), and for using the measured dynamic properties to assess the dynamic performance of the structure. The system and method of the present invention measures dynamic properties of the structure such as frequencies of resonance, mode shapes, and non-linear damping, and uses them in an analysis of the structure to compare the dynamic response of the structure with the anticipated properties of a structure built according to applicable building code requirements. Embodiments of the present invention include a mechanism and method to separate out the low amplitude data from the high amplitude data, which can be specifically applicable to bridges where traffic routinely provides high amplitude energy. The present invention thus quantifies a risk of failure of the structure by determining a risk ratio that compares an as-is condition of the structure with an as-designed condition of the structure. The present invention may be used for taking measurement for a short duration (minutes or hours), or is may be installed on the structure for longer periods (months or many years) for continuous monitoring for repetitive assessments. The results from the system and method of the present invention may be formatted and output as reports of various types (e.g., status/alert messages, visual, etc.).

Embodiments of the present invention are directed to systems and methods for measuring dynamic properties of a structure, where these measured properties can be used to assess future dynamic performance of the structure in response to a variety of events and environmental conditions. In some embodiments, in a case where the measured structure is a bridge, the dynamic properties can be more accurately measured if the impact of vehicles is not included in the measured response. To accomplish this, in some embodiments, the data can be collected with very sensitive sensors and processed with the certain appropriate algorithms to extract the dynamic properties from the inherent noise in the monitoring system. The measured properties may be compared with specifications to which the structure was designed and constructed, e.g., a building code or specific, detailed design specification for the structure that may incorporate the building code, also referred to as a design condition or design conditions, to determine and quantify a future risk of failure of the structure. Structures are designed and constructed to withstand certain events, e.g., earthquake, wind, occupancy/usage load, impact, vehicle traffic, etc. Typically, the design of the structure considers the type of event(s) likely to be encountered by the structure, and the likely magnitude of any applicable event(s). The structure is then designed to withstand any anticipated event(s), vehicle traffic or other loading, with an additional margin that serves to define a limit past which the structure is not expected to maintain structural integrity. This is referred to herein as an event limit. Thus, if a structure is exposed to an event exceeding the event limit, the structure is not expected, nor is it designed or constructed, to withstand such an event. Once a structure has been damaged, its ability to withstand an event limit may be negatively impacted.

The present invention is directed to a method and system for determining an as-is condition of a structure, and comparing that to an as-designed condition, to determine a risk of structural failure as a ratio of the as-is and as-designed conditions. In accordance with embodiments of the present invention, a characteristic (or characteristics) of a structure are determined by collecting data from a plurality of sensors placed at a plurality of locations of the structure. In some embodiments, the data acquired may be separated into a high amplitude data set and a low amplitude data set if desired. The data acquired by the sensors is used to determine a dynamic response of the structure, including determining a spectral response, a mode shape, and a damping characteristic of the structure, which are then used to determine an as-is condition of the structure. The as-is condition is compared with an as-designed condition to determine a risk ratio for the structure. The as-designed condition considers a hypothetical structure that is exposed to conditions specified and considered in the design of the structure, and further considers the response of the structure to such conditions. In other words, the as-designed condition considers how the structure would respond to conditions that were anticipated during the design, and that were factored into the design and construction of the structure. A risk ratio in accordance with embodiments of the present invention is determined using data acquired from the structure under the influence of various environmental conditions—the as-is condition—to compare the response of the structure to such conditions in the then-present condition of the structure, with the expected response of the structure to these conditions in the as-designed condition of the structure. The difference between these responses is an indication of the integrity of the structure, and of a risk of failure of the structure. The present invention, in an innovative and novel way, determines a risk ratio for the structure based upon the measured as-is condition and response, and the calculated as-designed condition and response, and quantifies a risk of failure of a structure. The present invention thus enables analysis and evaluation of a structure and a determination of a risk ratio for that structure that provides an indication of the likelihood of structural failure in response to conditions for which the structure was designed and constructed. The risk ratio of the present invention thus is a novel and unobvious improvement over prior art structural analysis methods and systems not only in what it achieves, but in how the present invention processes data collected from the structure and uses the processed data to determine a risk ratio for the structure. For structures with consistent loading which would impact the data to include added mass or forces, such as traffic, embodiments of the present invention provide a means to decipher the data which was altered from these forces.

The present invention is directed to a system and method that use raw data acquired from a structure to more accurately and usefully assess the condition of the structure, and importantly, the risk of structural failure. The present invention is directed to a particular, concrete solution to a problem, not to an abstract idea of a solution to the problem in general. The problem to which the present invention is directed is how to analyze the integrity of a structure after that structure has been subject to an event that may have affected the integrity of that structure. More specifically, how to analyze such structural integrity to calculate and quantify the risk of structural failure if the structure is thereafter exposed to conditions it was originally designed and constructed to withstand. The present invention thus provides multiple advantages over conventional systems and methods of structural analysis. First, the present invention does not just determine whether a structure has been damaged, it provides a system and method for determining the extent of structural damage. Second, the present invention provides does not only determine how damaged a structure is, it also quantifies the risk of failure of the structure after it has been damaged.

The present invention provides a particular implementation of a solution to this problem with a combination of innovative algorithms and electro- and electro-mechanical components. The method and system of the present invention are carried out by a combination of computer hardware and special purpose software comprising one or more algorithms that process data collected from the structure into various forms and outputs. Significantly, the present invention evaluates and processes data collected from a structure differently by comparing the as-is condition and the as-designed condition to yield a risk ratio that quantifies a risk of failure of the structure.

The present invention has broad application for structural assessments and continuous monitoring. It is an improvement over prior art technologies and techniques that are standard in various industries. The present invention provides the ability to quickly and accurately measure a structure's actual dynamic properties and yields an objective, measured and quantified assessment of the structure. The present invention then puts the dynamic properties of a structure in the context of the design intent and allows for an accurate and objective assessment that is relevant to the structure's intended purpose and therefore its safety. The present invention is also able to identify conditions or changes in conditions that identify structural weaknesses or damage. This present invention would provide a tool for engineers, insurers, property purchasers and others to obtain a more accurate and detailed assessment of the structure's condition, damaged state, risk to becoming damaged and insight into how it will respond to a significant future event it was designed and constructed to encounter.

An embodiment of the present invention is directed to a system for quantifying a risk of failure of a structure in response to an event, the structure being designed to withstand an event not exceeding an event limit, the structure having an as-designed condition. The system comprises: at least one sensor placeable at a location of the structure and configured to detect movement of the structure at the location and to generate an output signal indicative of movement of the structure at the location and a computing device having a processor and memory and being connectable to the at least one sensor. The computing device comprises: a data collection module to receive the output signal and store the output signal as measured data in memory; a data processing module configured to separate the low amplitude data from high amplitude data in the measured data into to allow for processing of the low amplitude data; connect the low amplitude data to form continuous low amplitude time history data for detailed processing; and determine a dynamic response of the structure from the continuous low amplitude time history data, wherein determining the dynamic response includes determining one of a spectral response, a mode shape, and a non-linear damping characteristic, the data processing module further determining an as-is condition from one of the spectral response, mode shape and non-linear damping characteristic, the data processing module further determining an as-is condition from one of the spectral response, mode shape and non-linear damping characteristic; and a risk ratio processor to determine a risk ratio of the structure by comparing the as-is condition with the as-designed condition, the risk ratio quantifying a risk of failure of the structure to withstand an event limit.

In an embodiment of the present invention, the data collection module stores wherein the data collection module stores the continuous low amplitude time history data.

In an embodiment of the present invention, the data processing module determines a spectral response applying a Fast Fourier Transform to the time history data.

An embodiment of the present invention further comprises a plurality of sensors selectively placeable at a plurality of locations of the structure, each of the plurality of sensors generating an output signal indicative of movement of the structure at each of the plurality of locations, wherein determining the mode shape comprises comparing the output signal of each of the plurality of sensors at a first location, with the output signal of each of the plurality of sensors at a second location, the first and second location being one of vertically and horizontally separated.

In an embodiment of the present invention, the data collection module stores the output signal as time history data which is separated into low amplitude and high amplitude data, and wherein the data processing module determines a non-linear damping characteristic using a random decrement method modified to consider a single mode of the time history low amplitude data.

In an embodiment of the present invention, the system further comprises a plurality of sensors located at a plurality of locations of the structure, and wherein the data processing module determines a mode shape by determining a magnitude of movement of each of the plurality of sensors at each of the plurality of locations.

In an embodiment of the present invention, one of the plurality of sensors comprises a reference sensor, and one of the plurality of sensors comprises a traveler sensor, the reference sensor being placed at a first location of the structure, and the traveler sensor being placed at a plurality of locations of the structure, wherein the data collection module receives the output signal from the reference sensor at the first location, and from the traveler sensor at each of the plurality of locations.

In an embodiment of the present invention, the separating of low amplitude data from high amplitude data in the measured data includes identifying portions of the measured data that reflect the influence of forces and added mass.

In an embodiment of the present invention, the separating of low amplitude data from high amplitude data in the measured data includes removing the identified portions.

In an embodiment of the present invention, the at least one sensor comprises one of an accelerometer, a geophone, a strain gage, a geo-positioning system, a camera, a vehicle counter and a displacement transducer.

In an embodiment of the present invention, the data collection module comprises a data logger.

In an embodiment of the present invention, the risk ratio processor determines a risk ratio of the structure by comparing the as-is condition with the as-designed condition using the formula $$\frac{F_{rm}}{F_{rd}} = \frac{\zeta_{rd} f_{rd}^2}{\zeta_{rm} f_{rm}^2}$$

where $F_{rm}$ and $F_{rd}$ are, respectively, a displacement force experienced by the structure for the as-is and as-designed conditions, $\zeta_{rd}$ and $\zeta_{rm}$ are, respectively, the damping of mode r for the as-is and as-designed conditions, and $f_{rd}$ and $f_{rm}$ are, respectively, the resonant frequency for the as-is and as-designed conditions.

In an embodiment of the present invention, the data processing module further determines a displacement per unit force for the as-is condition using the formula $$\frac{X_{rm}}{F_{rm}} = \frac{1}{8 f_{rm}^2 \zeta_{rm} M_{rm} \pi^2}$$

where $X_{rm}$ is a displacement experienced by the structure, $F_{rm}$ is a displacement force experienced by the structure, $\zeta_{rm}$ is the damping of mode r, $f_{rm}$ is the resonant frequency, and M is the modal mass of the structure.

In an embodiment of the present invention, the data processing module further determines a displacement per unit force for the as-designed condition using the formula $$\frac{X_{rd}}{F_{rd}} = \frac{1}{8 f_{rd}^2 \zeta_{rd} M_{rd} \pi^2}$$

where $X_{rd}$ is a displacement experienced by the structure, $F_{rd}$ is a displacement force experienced by the structure, $\zeta_{rd}$ is the damping of mode r, $f_{rd}$ is the resonant frequency, and M is the modal mass of the structure.

Another embodiment of the present invention is directed to a method for quantifying a risk of failure of a structure in response to an event, the structure being designed to withstand an event not exceeding an event limit, the structure having an as-designed condition, the method being carried out by a system comprising at least one sensor placeable at a location of the structure and configured to detect movement of the structure at the location and to generate an output signal indicative of movement of the structure at the location, and a computing device having a processor and memory and being connectable to the at least one sensor. The computing device has a program of instruction stored in memory that, when executed, cause the processor to: receive the output signal and store the output signal as measured data in memory; separate low amplitude data from high amplitude data in the measured data to allow for processing of the low amplitude data; connect the low amplitude data into a continuous time history for detailed processing; connect the low amplitude data to form continuous low amplitude time history data for detailed processing; determine a dynamic response of the structure from the measured data, which may be separated into high and low amplitude data, wherein, with the low amplitude date determining the dynamic response includes determining one of a spectral response, a mode shape, and a non-linear damping characteristic, the data processing module further determining an as-is condition from one of the spectral response, mode shape and non-linear damping characteristic; and determine a risk ratio of the structure by comparing the as-is condition with the as-designed condition, the risk ratio quantifying a risk of failure of the structure to withstand an event limit.

In an embodiment of the present invention, the output signal comprises time history data, and wherein determining a spectral response further comprises applying a Fast Fourier Transform to the time history data.

In an embodiment of the present invention, the system further comprises a plurality of sensors selectively placeable at a plurality of locations of the structure, each of the plurality of sensors generating an output signal indicative of movement of the structure at each of the plurality of locations, wherein determining the mode shape comprises comparing the output signal of each of the plurality of sensors at a first location, with the output signal of each of the plurality of sensors at a second location, the first and second location being one of vertically and horizontally separated. Also it would include a camera, vehicle sensors, or other hardware device to determine when a force is applies including vehicles are on the bridge to separate the low amplitude vibrations from the high amplitude vibrations.

In an embodiment of the present invention, the output signal comprises time history data, which is separated into low amplitude and high amplitude data and wherein determining a non-linear damping characteristic comprises using a random decrement method modified to consider a single mode of the time history low amplitude data.

In an embodiment of the present invention, the system further comprises a plurality of sensors located at a plurality of locations of the structure, and wherein determining a mode shape comprises determining a magnitude of movement of each of the plurality of sensors at each of the plurality of locations.

In an embodiment of the present invention, the separating of low amplitude data from high amplitude data in the measured data includes identifying portions of the measured data that reflect the influence of forces and added mass.

In an embodiment of the present invention, the separating of low amplitude data from high amplitude data in the measured data includes removing the identified portions.

In an embodiment of the present invention, determining a risk ratio comprises comparing the as-is condition with the as-designed condition using the formula $$\frac{F_{rm}}{F_{rd}} = \frac{\zeta_{rd} f_{rd}^2}{\zeta_{rm} f_{rm}^2}$$

where $F_{rm}$ and $F_{rd}$ are, respectively, a displacement force experienced by the structure for the as-is and as-designed conditions, $\zeta_{rd}$ and $\zeta_{rm}$ are, respectively, the damping of mode r for the as-is and as-designed conditions, and $f_{rd}$ and $f_{rm}$ are, respectively, the resonant frequency for the as-is and as-designed conditions.

An embodiment of the present invention further comprises the step of determining a displacement per unit force for the as-is condition using the formula $$\frac{X_{rm}}{F_{rm}} = \frac{1}{8 f_{rm}^2 \zeta_{rm} M_{rm} \pi^2}$$

where $X_{rm}$ is a displacement experienced by the structure, $F_{rm}$ is a displacement force experienced by the structure, $\zeta_{rm}$ is the damping of mode r, $f_{rm}$ is the resonant frequency, and M is the modal mass of the structure.

An embodiment of the present invention further comprises the step of determining a displacement per unit force for the as-designed condition using the formula $$\frac{X_{rd}}{F_{rd}} = \frac{1}{8 f_{rd}^2 \zeta_{rd} M_{rd} \pi^2}$$

where $X_{rd}$ is a displacement experienced by the structure, $F_{rd}$ is a displacement force experienced by the structure, $\zeta_{rd}$ is the damping of mode r, $f_{rd}$ is the resonant frequency, and M is the modal mass of the structure.

DESCRIPTION OF THE DRAWINGS

Embodiments of the present invention will now be described regarding the following figures, wherein:

FIG. 2 is a table depicting exemplary time and identification information for a plurality of sensors;

FIG. 3 is an exemplary digital record of data acquired from a plurality of sensors in accordance with an embodiment of the present invention;

FIG. 5A depicts first, second and third mode shapes of a hypothetical vertical structure such as a building or bridge pier and FIG. 5B depicts mode shapes for a lateral structure such as a span of a bridge supported at the ends;

FIG. 8 is a table depicting the resonance response at four different positions for two modes of vibration, with the absolute measurement converted to a normalized ratio of the positional response to the reference response, with the normalized ratios being used to depict the mode shape;

FIG. 19 is an exemplary table of a risk ratio calculated in accordance with embodiments of the present invention;

DESCRIPTION OF EMBODIMENTS OF THE INVENTION

Figure 1:
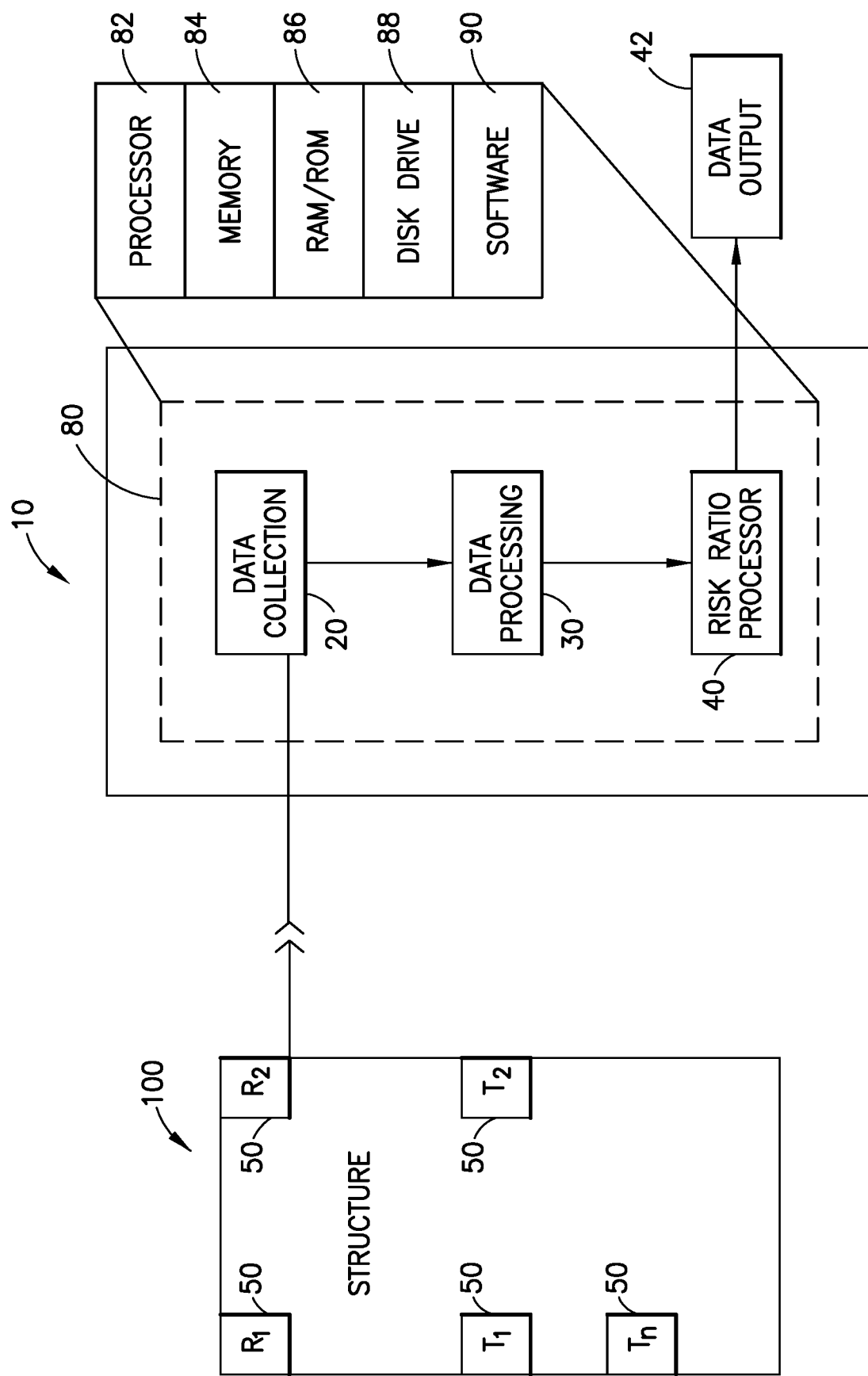
FIG. 1 depicts a system for determining the condition of a structure in accordance with embodiments of the present invention.

The following describes exemplary embodiments of the present invention. It should be apparent to those skilled in the art that the described embodiments of the present invention are illustrative only and not limiting, having been presented by way of example only. All features disclosed in this description may be replaced by alternative features serving the same or similar purpose, unless expressly stated otherwise. Therefore, numerous and various other embodiments are contemplated by, and fall within the scope and spirit of the present invention.

The term "structure" is used herein broadly to refer to a physical system. In practical terms a structure is a physical entity (normally a civil engineering structure such as a bridge, building or chimney) around which a system boundary can be drawn (or imagined) that separates the structure from the non-structure (for instance the soil) (i.e., delineates what is the structure from what is not). The techniques used to analyze the structure in accordance with embodiments of the present invention attribute parameters to the physical system so as to describe it mathematically. Thus, the present invention is useful for, and may be use for any structure, without limitation. As used herein the term "location" refers to different horizontal positions along the same horizontal plane of a structure, the same vertical position along different horizontal planes of the structure, and different horizontal positions along different vertical planes of a structure.

The present invention is directed to a system and method for analyzing the dynamic properties, and for assessing the dynamic performance of a structure in response to an event or forces such as traffic loading. As used herein, the term "event" refers to any natural or man-made occurrence, or a combination thereof, that may affect a structure. Traffic loading refers to the loads from vehicular traffic over bridges. Non-limiting examples include wind, earthquake, precipitation, flood, impact, occupancy, controlled vibration, traffic from cars, trains and people, etc. The present invention acquires dynamic data from the structure that may be used by the present invention to determine a dynamic structural response and a risk ratio of the structure. This data may be acquired during the occurrence of the event or otherwise. The acquired data is processed to determine a dynamic response of the structure, including a spectral response, mode shape, and non-linear damping characteristic, which are then used to determine an as-is condition for the structure. The acquired data may be separated to the high amplitude and low amplitude components if the low amplitude data provide superior accuracy for the analysis. The present invention compares the as-is condition with an as-designed condition to determine a risk ratio for the structure that provides an accurate and timely indication of the likely dynamic response of the structure to an event inside or outside of a range of events for which the structure was designed and constructed to withstand, i.e., the design condition. The present invention thus enables an accurate dynamic analysis of a structure, and a quantifiable determination of the risk of that structure being compromised or failing if exposed to an event for which the structure was designed to withstand.

A system in accordance with the present invention comprises a plurality of sensors, a data collection module, a data processing module, and a risk ratio processor. Input to the data collection module is from the plurality of sensors located in or on the structure and collected over a predefined period of time. Some of the sensors are stationary for that period of time, while some sensors are moved to different locations of the structure during data collection. A system of cameras, vehicle detections strips, or other device used to determine when exterior loading can be applied to the structure is used to separate data sets to low and high amplitude. The data processing module comprises one or more algorithms to receive data as input from, or to utilize data stored by the data collection module and to process that data for further use by the data processing module and/or for use by the risk ratio processor. The data processing module receives input data from the data collection module, or utilizes data stored in memory by the data collection module, and, using the one or more algorithms of the data processing module, determines a spectral response, a mode shape, and a non-linear damping characteristic of the structure. The one or more algorithms of the data processing module further determine an as-is condition of the structure, which is used by one or more algorithms of the risk ratio processor to determine a risk ratio of the structure. The risk ratio can be compared with known or predetermined values of risk to assess and quantify the risk of failure of the structure. A return period may also be calculated to quantify the length of time expected to pass before an event of a particular magnitude (for which the structure was designed and constructed to withstand) occurs next—the inverse of which is the annual probability of occurrence of such an event.

The present invention thus compares measured data of a structure with parameters of a design specification to which the structure was built, e.g., building code requirements, and provides a way to monitor a structure and compare its measured response with the response to be expected if the requirements of the code of practice are followed rigorously in the design and construction of the structure. Bridge design requirements typically require the bridge to withstand traffic loading and other forces.

In accordance with an embodiment of the present invention, a system 10 is provided comprising one or more sensors 50 and a computing device 80 comprising a data collection module 20, a data processing module 30 and a risk ratio processor 40. The system 10 may be enabled with a single computing device 80 having a processor 82 that may be a single processing unit or a plurality of processing units, as a routine matter of design choice, designed and configured to control the system 10 and aspects of the present invention as discussed in further detail herein. The computing device 80 generally comprises one or more processors, memory, software, including general purpose software providing basic operational functionality for the components, and special purpose software providing specific operational functionality for the components to carry-out aspects of the present invention, and interfaces necessary to receive input and provide output of data and information. The computing device 80 also preferably comprises memory 84 consisting of volatile memory 86 that may be fixed or removable random access memory (RAM), read-only memory (ROM), flash memory, or any other known or hereafter developed electronic storage component or device that requires power to sustain the data in memory. Memory 84 also consists of non-volatile memory 88 that may be a fixed or removable hard disk drive, or that may be cloud-based data storage, or any other known or hereafter developed electronic storage component or device that does not require power to sustain the data in memory. In a system 10 with a unitary computing device 80, the data collection module 20, data processing module 30 and risk ratio processor 40 each access and utilize computing resources of the system such as the processor 82 and memory 84. In addition, certain functionality of each of the data collection module 20, data processing module 30 and risk ratio processor 40 may be carried out by one or more instructions stored in memory 84 and executed by the processor 82. Alternatively, the system 10 may comprise a plurality of computing devices 80 consisting of one or more separate components or modules for each of the data collection module 20, data processing module 30, and risk ratio processor 40, each having its own processor 82 and memory 84, and each designed and configured to carry-out aspects of the present invention with one or more algorithms, as discussed herein. Unless expressly identified, discussion herein of the present invention applies to a system 10 having either a unitary or a plurality of computing devices 80. The computing device 80 may also include a display, input and output devices, signal generating devices (e.g., audio), and other devices and components known in the art for computing devices.

Communication between the system 10 and any external system, device, component, etc., may occur using any known or hereafter developed communication technologies, systems and methods. In a embodiments, the system 10 of the present invention may provide output via a user interface, a web site, mobile device application, or other means for communication information and data. The system 10 may be used for continuous monitoring of a structure, or for episodic monitoring, e.g., post occurrence of an event. The system 10 may be configured to determine if any data acquired by the data collection module 20 indicates structural anomalies that could raise concerns as to the integrity of the structure. For continuous monitoring, the system 10 can initiate automatic alarms when some of the parameters measured go outside a predetermined range of values, and the system 10 may provide alerts via email, text or other method that an alarm level was exceeded.

A system 10 in accordance with embodiments will now be discussed in greater detail, with reference to the Figures and with initial reference to FIG. 1. The system 10 comprises a plurality of sensors 50 placed at a plurality of locations of a structure 100. The system 10 further comprises a computing device 80 comprising a data collection module 20 designed and configured to receive an output signal comprising data from the plurality of sensors 50. The data from the plurality of sensors 50 may comprise acceleration data indicative of force and displacement experienced by the structure 100 at the location of the sensor 50, and may be represented as a voltage, as depicted in the table of FIG. 3. The data collection module 20 thus acquires data characteristics of the structure 100 useful for determining the dynamic response of the structure 100 to an event. The data collection module 20 stores this data as measured data in memory 84. The data processing module 30 is designed and configured to determine a dynamic response of the structure 100 from the measured data, including, by way of non-limiting example, frequency spectra, mode shape, and non-linear damping characteristic, and stores the determined dynamic response in memory 84. The data processing module 30 comprises one or more algorithms designed and configured to determine the dynamic response characteristics, and to also determine an as-is condition for the structure 100 based upon the determined dynamic response characteristics. The risk ratio processor 40 of the system 10 of the present invention is designed and configured to receive output from the data processing module 30 (or access data stored in memory 84), namely the as-is condition, and determine a risk ratio of the structure indicative of the risk of failure of the structure 100 if the structure is exposed to an event for which the structure 100 was designed to withstand.

The first step to measuring the dynamic response of a structure is planning where to place the sensors and for how long. This is an important part of any good analysis and requires basic knowledge of the structure, and of how the data acquired by the sensors 50 needs to be evaluated to yield a valid analysis. The dimensions of the structure also need to be known for certain parts of the analysis. The data collection module 20 may have a user interface (not shown) that will enable a user of the system 10 to input specific information about where the sensors 50 are located, measuring times, dimensions of the structure 100, and other relevant information to ensure that the system 10 accurately and correctly processes data acquired from the sensors 50. The user interface may comprise a web application accessible with a mobile computing device (e.g., mobile phone, tablet, smartwatch, etc.) capable of connecting to and interfacing with the system 10. Alternatively, software may be provided as part of the data collection module 20 to enable a user interface.

The system 10 includes a data collection module 20 designed and configured to receive and record data from a plurality of sensors 50. The sensors 50 needed for the purpose of taking dynamic measurements are generally very sensitive accelerometers which take acceleration measurements along 3 axes, X (laterally), Y (longitudinally), and Z (vertically). In some embodiments, a method of segregating the data into portions which have the effect of traffic or forces is used to decide which data is appropriate for analysis. Data collected from sensors 50 may be stored in memory 84 of the system 10 and/or data collection module 20, which may comprise or include an electronic data logger that converts voltages received from the sensors 50 and stores them as a digital record 300, as depicted in FIG. 3. A digital record 300 may comprise a plurality of data entries 310 for a sensor 50, each of the plurality of data entries 310 being for a specific time at which the data was recorded. This is also referred to as a time history for a sensor 50. Preferably, each digital record 300 is stored in non-volatile memory 88. The digital record 300 depicted in FIG. 3 represents data collected from a single sensor 50 along 3 axes, as identified in columns B, C and D, with column E being the vector sum of columns B, C and D. Additionally, more columns of data from other devices could be included and used for additional quantifying information. To increase efficiency, a sensor 50 may be located to provide the GPS coordinates of each sensor at any given time, data from which would also be included in the digital record 300.

Timestamp information for each data entry is provided in column A. The particular time stamp in FIG. 3 shows a recording interval between data entries 310, i.e., between measurements, of 0.0005 seconds, or ½₀₀₀th of a second or 2000 hertz. To effectively measure most structures, a frequency of measurement of 200 hertz is acceptable. Various recording frequencies may be necessary depending on the structure. Similar digital records 300 may be simultaneously created for other sensors 50. Thus, if the data collection module 20 is receiving data from 5 tri-axial sensors 50, as depicted in FIG. 1, the data collection module 20 will create 5 digital records 300 as shown in FIG. 3, one for each of the 5 sensors 50. For each digital record 300, representing a time history of appropriate data collected from each of a plurality of sensors 50, spectra from each measurement location can be created. In general, 15 minutes of acceleration data can be processed from a traveler sensor 50 to yield a defined spectral response with a clear frequency and amplitude. The time history data for different parts of the structure can be analyzed for deflections in the same mode through a phase analysis, indicating which portions of the structure are moving together, or in phase, and which parts are not moving together, or out of phase.

Identifying each sensor 50 location dictates how the data will be processed and is essential to the analytical process of the system 10. The position of each measurement (i.e., the location of each sensor 50) is coded so as to allow the whole-body definition of each mode of vibration. In this, the response at a frequency of resonance is calculated and is converted to an overall displacement at that frequency for each sensor location in turn. As shown in FIG. 1, a sensor 50 may be a reference sensor, as indicated by an "R," or a sensor 50 may be a traveler sensor 50, as indicated by a "T." Reference sensors 50 are preferably maintained in one location while data is acquired by the data collection module 20 to keep a continuous record of how the portion of the structure at that one location reacts to the occurrence of an event. Traveler sensors 50 may be placed at a location for a defined period of time, and then relocated to another location of the structure, with data acquired from each location at which a traveling sensor 50 is placed.

In an embodiment of the present invention, the user interface may present an image of the structure and allow a user to drag a sensor 50 to a desired location of the structure. This functionality is for identification purposes only, i.e., only serving to identify a location of the structure at which a sensor 50 is located, not actually placing the sensor 50 at that location, which requires human or machine involvement. The user interface also enables a user to input information about the structure 100 necessary for the system 10 to carry-out aspects of the present invention. For example, dimensions, materials, age, occupancy, etc., some of which may be generated from photos such as from Google Earth or other sources.

A sensor 50 may be any of an accelerometer, geophone, strain gage, geo-positioning system (GPS) and displacement transducer by which acceleration may be converted into displacement. Based on the need for accuracy and sensitivity, accelerometers are currently most effective for dynamic measurements. A sensor, camera or other method, as would be known to those of skill in the art may be used to segregate the data into high and low amplitude data. However, to measure the dynamic response of a structure under ambient, which is the low amplitude content, conditions requires a very sensitive device with an extremely low noise floor, preferably having a sensitivity with a dynamic range under 120 dB. The best types of sensors for these measurements currently are so-called force balance accelerometers. However, with the improvement of MEMS style accelerometer devices, these are becoming acceptable for measuring the dynamic response of a structure under ambient conditions. In a preferred embodiment, each sensor 50 comprises a highly sensitive accelerometer capable of measuring small displacements of the structure.

The sensors 50 are generally powered by a low voltage and provide an output which is also a voltage. The sensors 50 may be hard wired into the data collection module 20, in which case power to the sensor 50 may come from the data collection module 20. Alternatively, a sensor 50 may have a self-contained energy source and transmit data wirelessly to the data collection module 20, as a routine matter of design choice. With the improvements to sensing technology, and the corresponding reduction in weight, as well as the ability to have self-contained power and data storage would add efficiency in the future by potentially allowing sensors to be placed on a building with robots or drones.

The system 10 further comprises a data processing module 30 designed and configured to carry-out aspects of the present invention. The data processing module 30 receives input from the data collection module 20, which can be accomplished by the data processing module 30 accessing data stored in memory 84 by the data collection module 20. The data processing module 30 comprises one or more algorithms embodied by special purpose software 90 stored in memory 84 and that, when executed by the processor 82, processes certain data acquired by the data collection module 20 to determine one or more characteristics relevant to the dynamic behavior of the structure 100. Exemplary characteristics include, but are not limited to frequency spectra or spectral response, mode shape, modal ratios, amplitude and damping analysis, and identifying anomalies indicative of weakness or damage in the structure 100.

Figure 4:
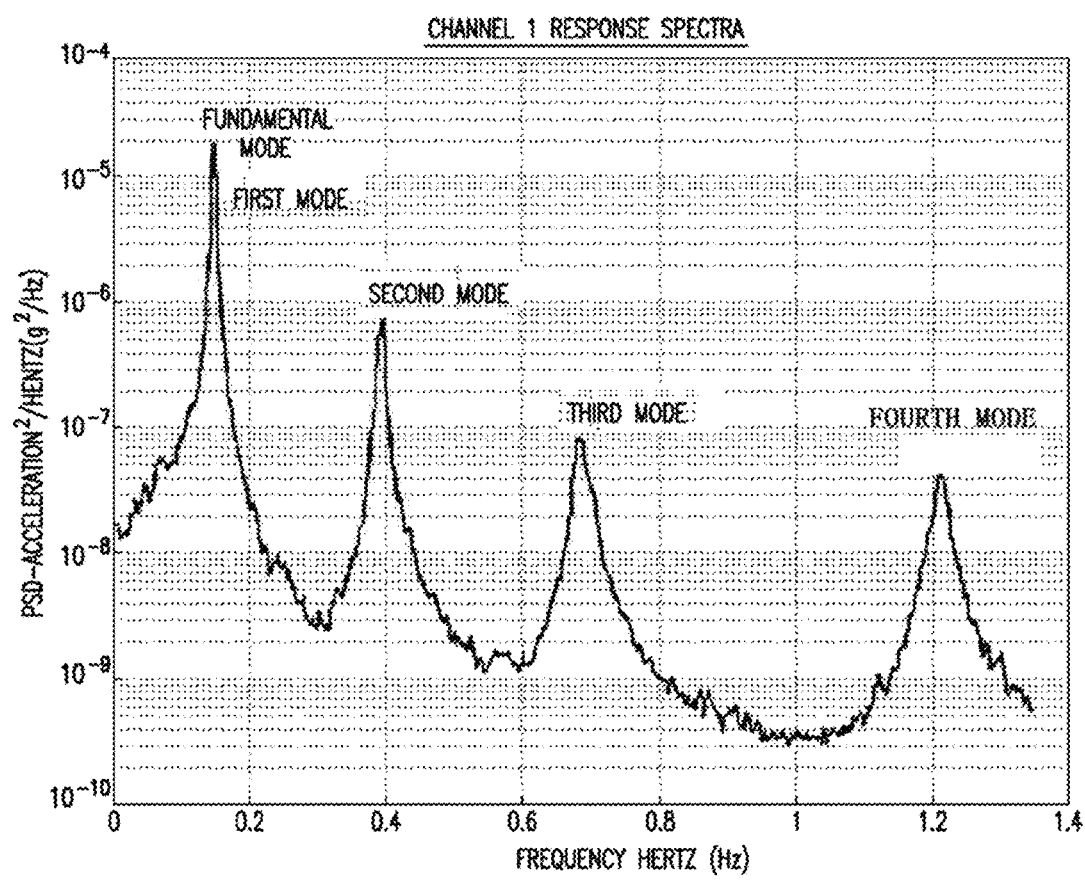
FIG. 4 is an exemplary frequency spectra of a structure in accordance with embodiments of the present invention.

A structure 100 can be characterized by its frequency spectra, which is useful for evaluating the dynamic response of the structure 100 to the occurrence of an event. The data processing module 30 converts data in a digital record 300 into frequency spectra using a mathematical script such as a Fast Fourier Transform. Frequency spectra of the structure 100 is thus determined, as depicted in FIG. 4, that represents a plurality of modes and their respective resonant frequencies. The peaks in FIG. 4 reflect the frequency at which energy is concentrated, and further represents a frequency of resonance for a mode of vibration. In FIG. 4, a fundamental mode (also called the first mode) frequency of the structure occurs at 0.15 Hz, a second mode at 0.4 Hz, a third mode at 0.65 Hz, and a fourth mode at 1.2 Hz. The amplitude is on a logarithmic scale whose units are acceleration squared/hertz ($g^2/Hz$). Simple harmonic motion can be invoked to convert acceleration to displacement at the measurement position for each frequency analyzed.

A structure 100 may also be characterized by its mode shape, which is also useful for evaluating the dynamic response of the structure 100 to the occurrence of an event. The data processing module 30 integrates and automates elements of system identification techniques to identify mode shapes of structures. The relative response at different positions on the structure together form a mode shape— which is the deflected form of the structure in a resonance condition. The input is the time history of motion at all of the selected positions. The ensemble forms the mode shape for the resonance at a particular frequency. As discussed above, each spectral peak represents a frequency of resonance for a mode of vibration. In some circumstances, as discussed in further detail below, forces that cause the high amplitude response can cause significant error in the analysis of the spectral response of the structure. On the other hand, high amplitude data can be useful for other forms of analysis. The complete dynamic response of a structure (in a given frequency range) can be viewed as a set of individual modes of vibration, each having a characteristic natural frequency, damping, and mode shape. By using these so-called modal parameters to model the structure, problems at specific resonances can be examined and subsequently solved. For each of these modes of vibration, the structure deflects. This is known as the deflected mode shape. The mode shape of an exemplary structure (in this case, a building, or a bridge pier) is depicted in FIG. 5A, in which a first, second and third mode are shown. The frequency at which a structure moves is directly related to its modal stiffness and the participating modal mass in that mode of vibration. Thus, when the frequency of resonance moves to a lower value this reflects either less stiffness, more participating mass, or both. The mode shape of another exemplary structure (in this case, a bridge span) is depicted in FIG. 5B, in which a first, second and third mode are shown.

Figure 6:
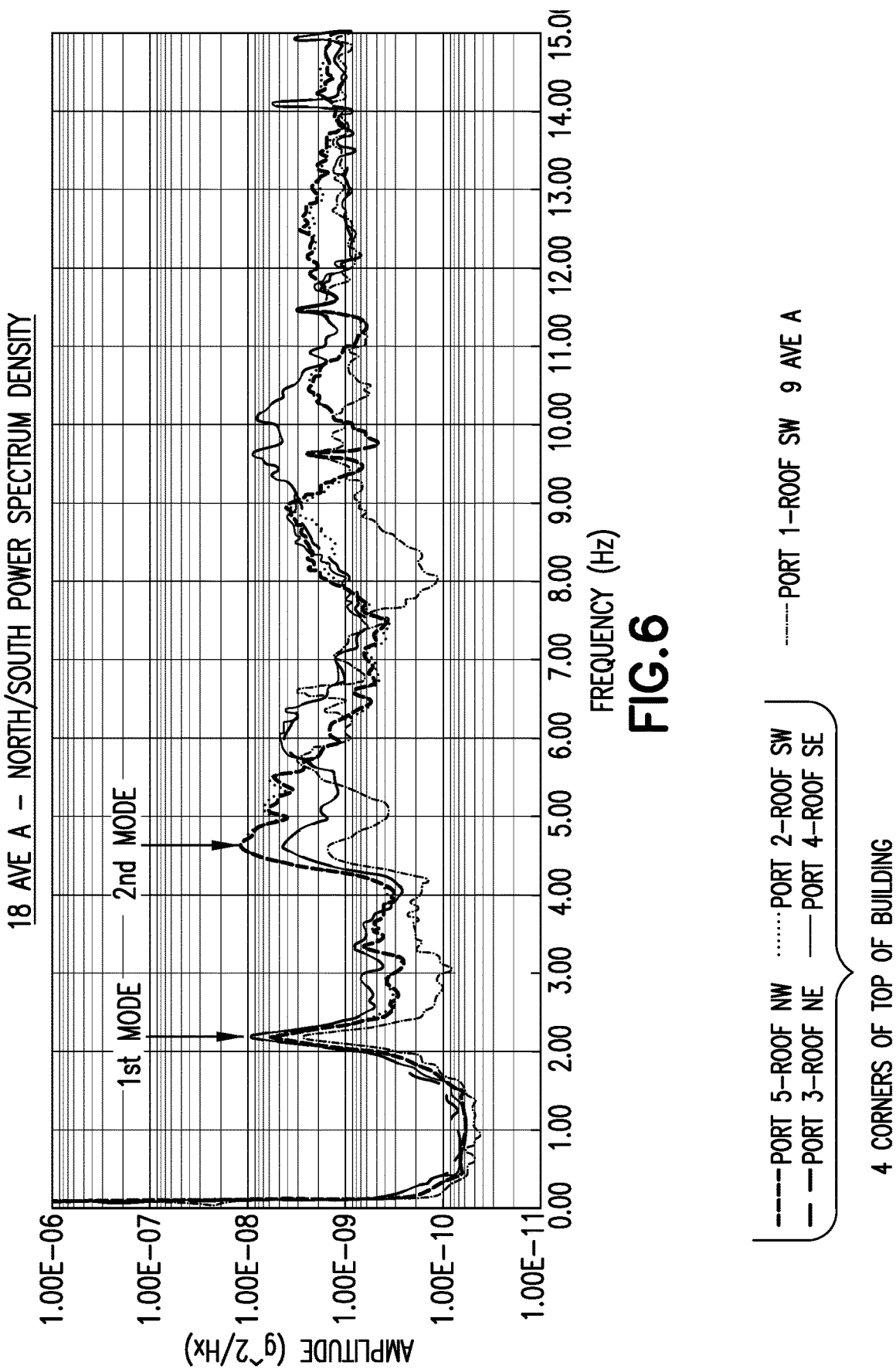
FIG. 6 is an exemplary power spectrum density of a structure from a plurality of sensors at different locations of the structure in accordance with embodiments of the present invention.
Figure 7:
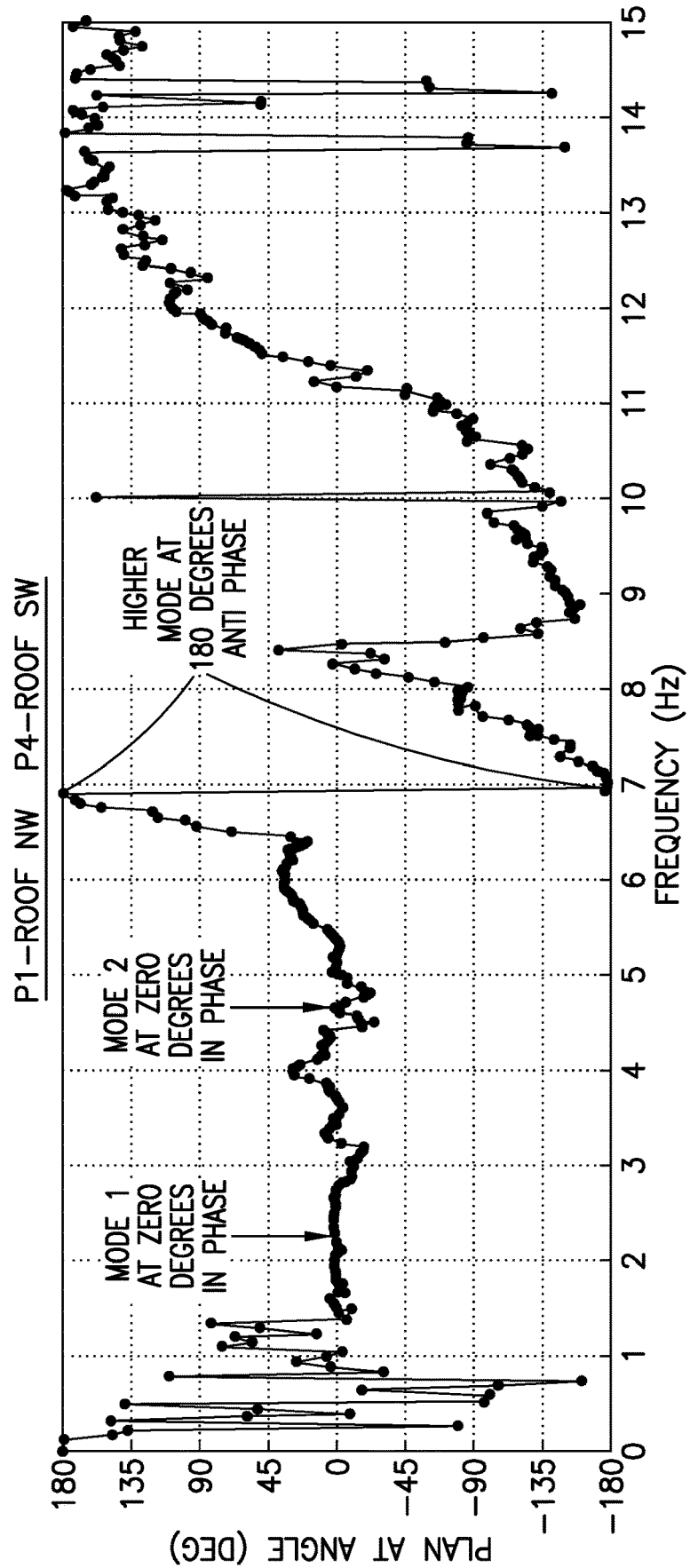
FIG. 7 is an exemplary frequency/phase spectra of a structure from two sensors at different locations of the structure in accordance with embodiments of the present invention.

Putting the spectra from different parts of the structure 100 together on the same graph illustrates how various parts of the structure 100 are moving in a certain mode of vibration. For instance, if 4 sensors 50 are placed at locations on the top of a building (Roof NW, Roof SW, Roof NE and Roof SE), the magnitude detected by each sensor 50 can be compared with that of the other sensors, as depicted in FIG. 6. In the spectra shown in FIG. 6, a first and a second mode of vibration are identified and the amplitude measured by each sensor 50 is indicated. For each mode of vibration, the displacement detected by each sensor 50 represents the amount of displacement of the structure 100 at the sensor 50 locations. Thus, the magnitude of movement at each location can be determined for each mode of vibration, providing an indication of the structural dynamics at each location. This can be done for all measured modes of the structure 100. Since the mode shapes are expected to be consistent through the elastic range, the mode shape helps identify the structure's behavior and is relevant throughout the elastic range. This is an important aspect of the analysis since it speaks directly to areas within the structure that have varied levels of stiffness, or possibly, variations in participating mass. There are many potential reasons for these variations, some of which include structural weaknesses and damage. It also highlights areas which are more susceptible to damage which is very important when predicting where damage may occur. If forces and mass vary which can occur when traffic is on a bridge, then the accurate measure of these dynamic parameters can be changed. Since one purpose of embodiments of the present invention is to understand the dynamic parameters of the structure, reducing error from the extraneous forces and mass is essential to complete an accurate analysis The present invention also considers the phase of the first and second modes of FIG. 6, as shown in FIG. 7, to determine how certain portions of the structure 100 are moving together with respect to each other, i.e., whether they are moving in-phase or anti-phase. Such a phase analysis can be performed with sensors 50 located on the same vertical level, or on different vertical levels of the structure 100. This phase analysis enables the present invention to determine if the movement is a first order, second or higher order mode shape. It also enables the present invention to determine if the structure is moving in bending or torsion, or in a mode that is coupled with another mode. The phase between different portions of the structure is an essential aspect of defining the modes of vibration and can be used to identify modes of vibration that may not be anticipated, may be the result of damage to the structure, or a potential problem. This is shown in FIG. 7, in which the frequencies at which portions of the structure 100 are in phase have a 0-degree phase angle, and portions that are out of phase have other than a 0-degree phase angle. Portions of the structure 100 that are moving opposite each other are represented by a 180-degree phase difference in FIG. 7. This is a critical element of identifying the mode shapes. The phase between two measurement positions is determined for all the measurement positions. One measurement position is chosen as a reference and the phase of all the other positions is determined with respect to the reference position. Ideally, these measurements should show that the movement is one of two possibilities—either in-phase, or anti-phase (i.e. moving together or in opposition to each other). A third possibility is of 90-degree movement that can occur when the movement in a mode shape is calculated for a nodal position (one with no dynamic movement at that position) for that mode of vibration. When measuring at a nodal position a residual response from off resonance modes of vibration occurs, and it occurs at 90 degrees to the reference position. Clearly the reference position should be chosen so that it will not be located at a nodal point for any of the modes under analysis. Phase is measured through a standard algorithm using a standard mathematical toolbox of formulae, as known to persons of ordinary skill in the art. By identifying the frequencies, quantifying the relative movement of the structure at selected locations and determining the phase of motion in different parts of the structure, the present invention can determine a deflected mode shape for the structure 100.

Figures 9A, 9B:
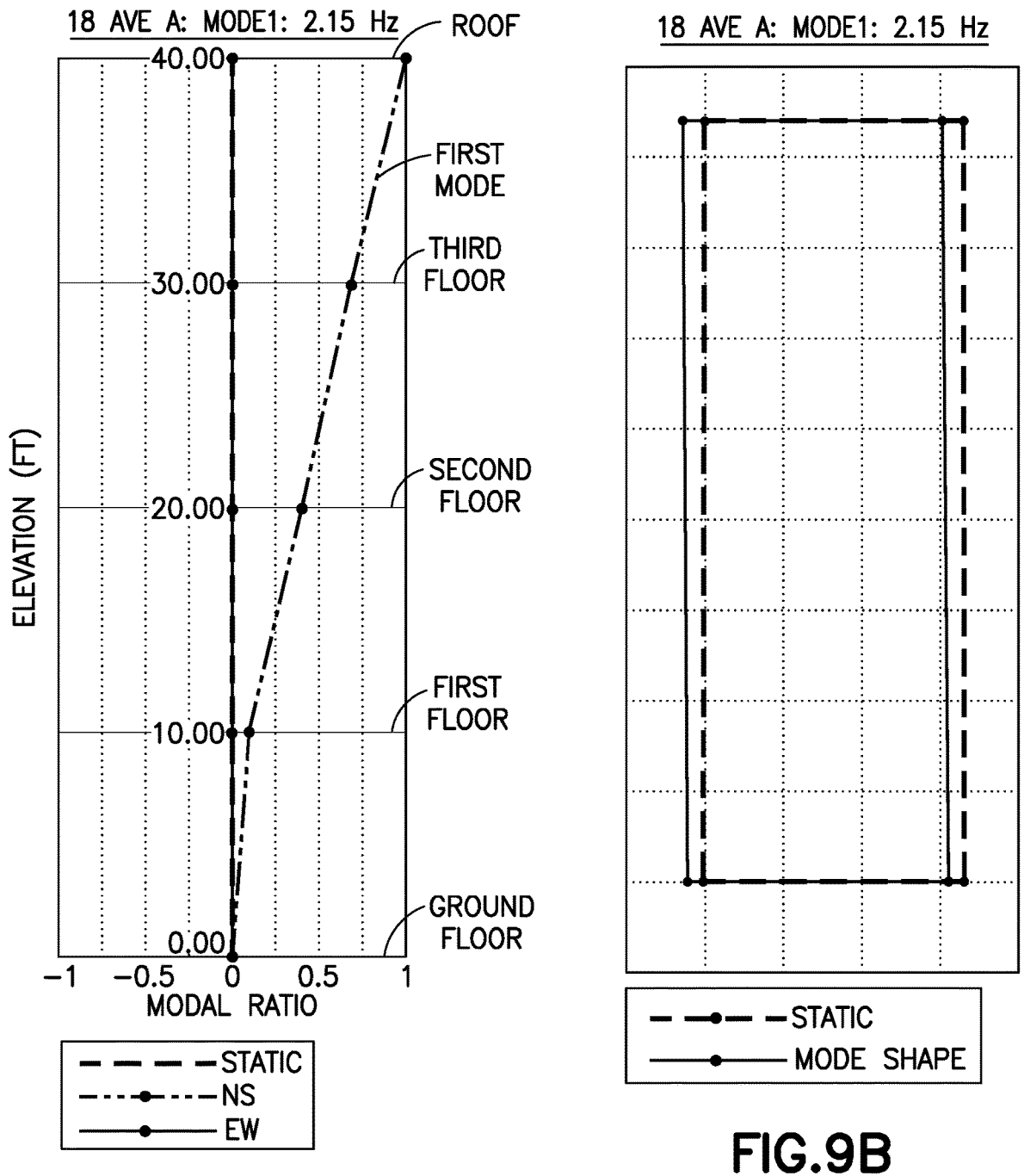
FIGS. 9A and 9B depict, respectively, profile and plan views of a first mode shape of an exemplary structure.
Figures 10A, 10B:
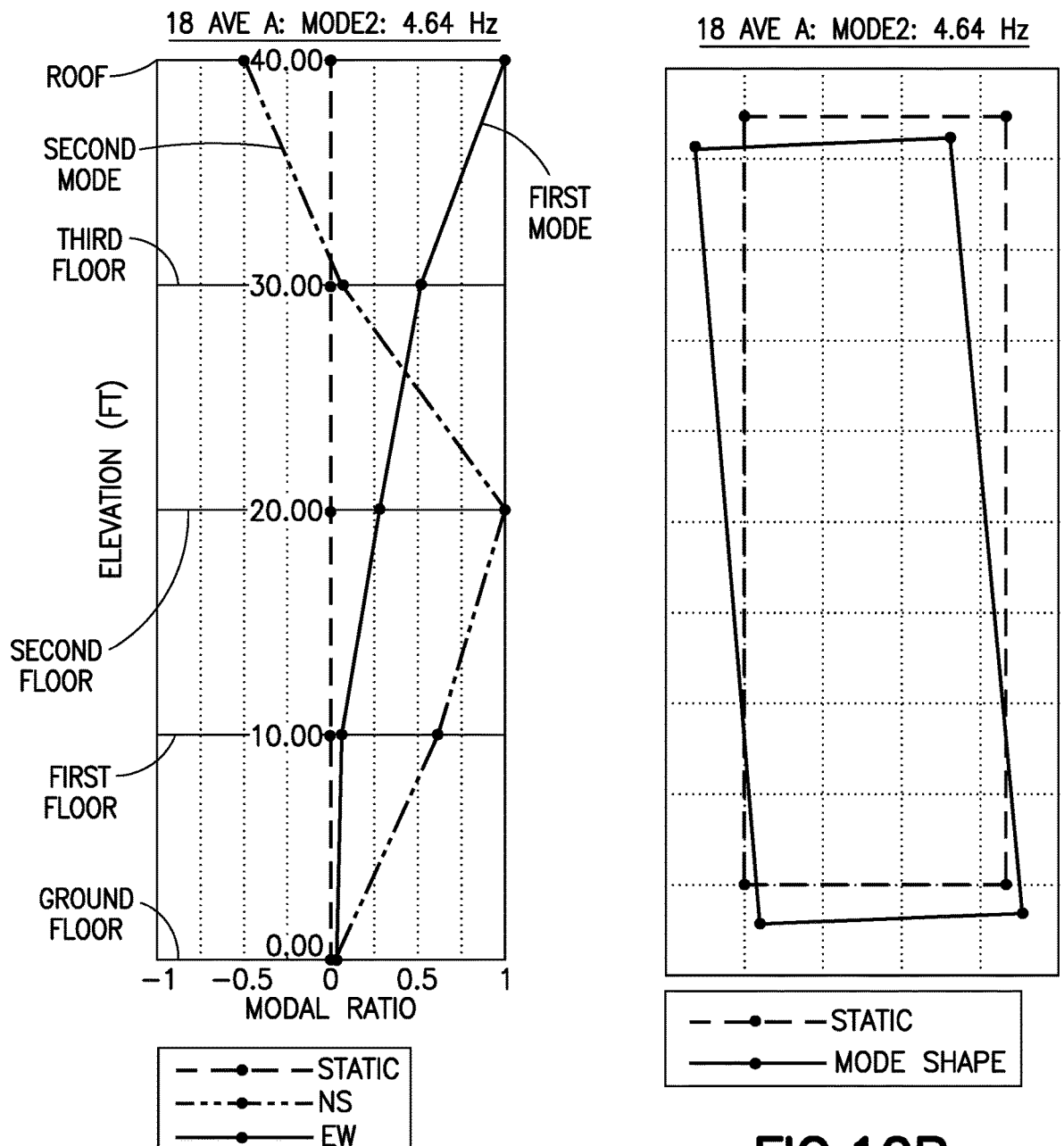
FIGS. 10A and 10B depict, respectively, profile and plan views of first and second mode shapes of an exemplary structure.

The mode of the structure 100 can be depicted graphically to illustrate the lateral displacement measured by sensors 50 at various locations, including lateral displacement differences from floor-to-floor, and for different modes, as shown in FIGS. 9A and 9B, and 10A and 10B for an exemplary building. A plan view of a building is depicted in FIGS. 9B and 10B, and illustrates how the 4 corners of the building (i.e., NW, SW, NE, SE) move relative to each other for a first mode (FIG. 9B) and a second mode (FIG. 10B). FIG. 8 provides the peak amplitude from the spectra, the acceleration and measured displacement, and shows the equations and mechanics of establishing a mode shape. These data are used to determine the mode shape by calculating a normalized ratio of displacement from the table in FIG. 8. The data in FIG. 8 show the resonance response at four different positions for two modes of vibration. The absolute measurements of columns A, B and C are converted to a normalized ratio of amplitude and displacements (columns D and E) of the positional response to the reference response and these normalized ratios are used to depict the mode shape. A profile view of the building is depicted in FIGS. 9A and 10A illustrates the deflected mode shape and the relative lateral displacement at each floor of the building for first and second order modes. The same process is used for mode shapes in the 3 directions. The normalized mode shape is calculated using the vector sum of the responses at each measurement position. Each transducer has triaxial measurements and the measurements are repeated for each of the three directions and then resolved to a vector describing the motion at that location. Any abnormalities in the mode of vibration are depicted by larger responses at affected locations. This indicates a local weakness in the structure. This can help identify a severe structural weakness if the anomaly is excessively large.

In FIG. 10A it can be seen that, for the second mode, the mid-height of the building is moving in anti-phase to the top of the building. The relative lateral displacement of the first and second floors is larger than the motion at the top of the building.

Figure 11:
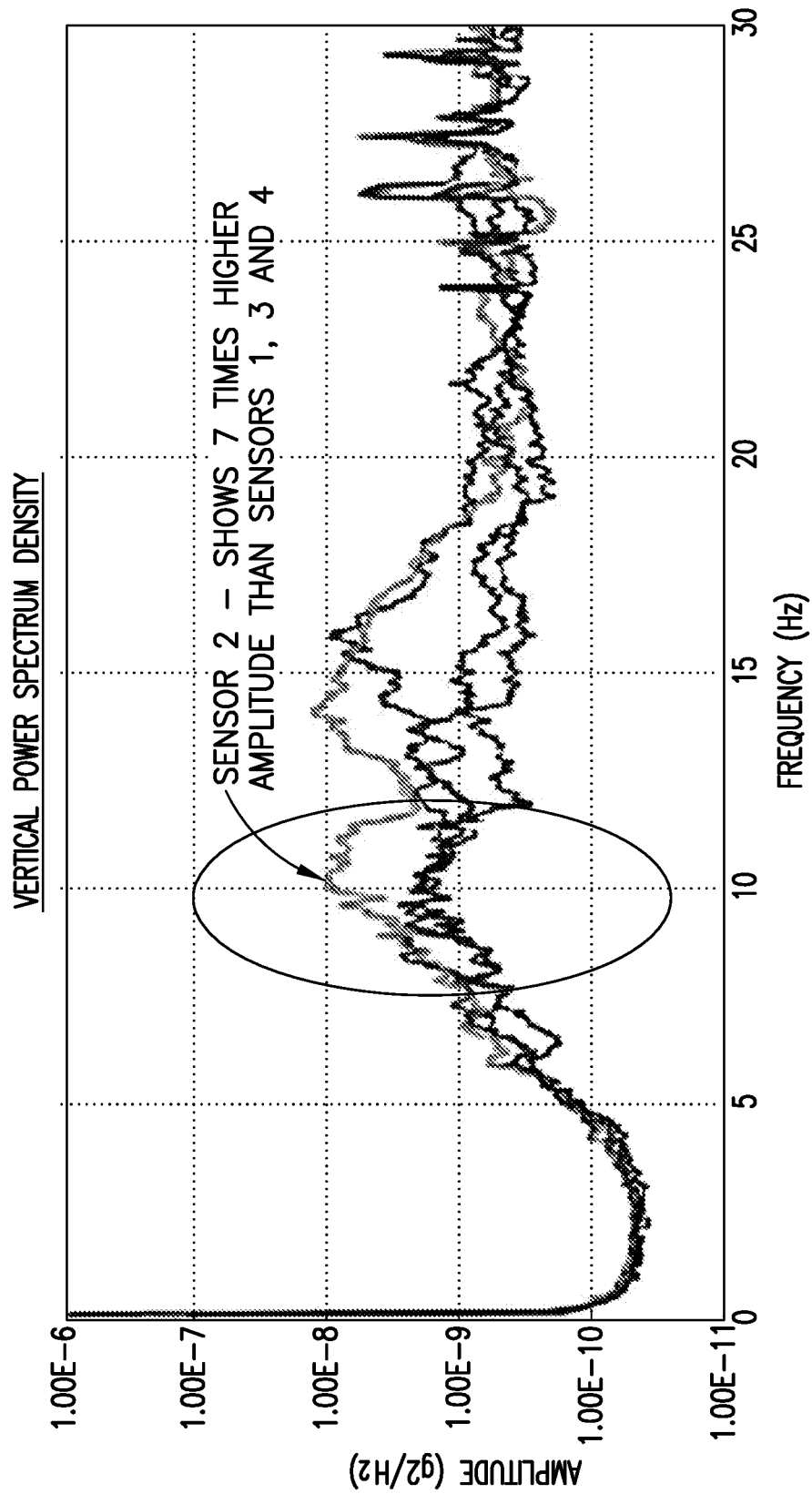
FIG. 11 is an exemplary power spectrum density of a structure from a plurality of sensors at different locations of the structure in accordance with embodiments of the present invention.

Data on vertical movement of a structure is also useful when analyzing the dynamic response of a structure to an event. The amplitude of a signal distributed over a frequency range (also referred to as a vertical power spectrum) is depicted in FIG. 11. Vertical movement is measured by a plurality of sensors 50 placed on four corners of the top of a building. As with the lateral displacement discussed above, the relative vertical movement of the structure at different locations can be compared by plotting the spectra from these measurement positions on the same graph, as in FIG. 11. In this case, one portion of the building is vibrating and moving 7 times more than the other positions in the vertical direction. This can often correspond with poor soil conditions. The first vertical mode of vibration can be used to determine the soil spring constant. With inputting the specific footing dimensions, this spring constant could be determined by the present invention.

The data processing module 30 further comprises one or more algorithms designed and configured to determine a non-linear damping characteristic for a structure 100. An analysis of the damping response of a structure, i.e., determining a damping signature of a structure, is an important aspect of the structural analysis provided by the present invention, and is considered by the risk ratio processor 40, as discussed in more detail below. The damping response is calculated using the random decrement (RANDEC) method, which was originally developed by NASA. Processing via embodiments of the present invention modify previous methods for calculating a damping response to filter the time history to allow only the data associated with a single mode of data to pass through for analysis. In some embodiments, the data includes high amplitude data and low amplitude data. In some embodiments, the high amplitude data and low amplitude data are separated, as is discussed in further detail below, and the low amplitude data is then processed. Low amplitude data is typically caused by ambient energy in the environment and does not have the influence of a force which could impact the time history and change the frequency and damping content. Embodiments of the invention process the decay of the response to low amplitude data and establishes a decay of response specific to a structure, without the influence of outside forces or added mass, such as vehicle traffic.

Thus, high amplitude data is typically data which is caused by the force such as a vehicle, heavy wind or earthquake. Specifically, with a vehicle it can include a moving mass.

The data are further filtered using a novel procedure that looks for and removes large and sudden deviations from the average values to remove a singularity from the response data, in which the forced response appears as an apparent response. The present invention removes data possibly affected by the singularity since there is no detriment to removing too much data. The data are then analyzed for a series of responses at different amplitudes. The analysis involves the assemblage of short data segments that are summed for at least 3000 individual segments. The resultant in each case consists of random noise, a response with random phase, and a response which represents a decay of oscillation with an envelope described by the circular natural frequency and the damping. In the limit, the random noise and random phase terms tend to zero. If enough samples are taken these become close to zero. Using 3000 averages has been found to give a value that is close to zero. The remaining response reinforces and produces a response that is equivalent to a decay of oscillation of a single mode of response with an envelope that is described mathematically with only frequency and damping as the unknowns. The present invention then fits a curve, using the mathematical equation for the decay of oscillation, at every measured point in the decay (not just the envelope peak values) and then changes first the frequency and then the damping, so that the errors between the theoretical curve and the measured curve produce the best fit to the calculated decay curve. This process is repeated for each of the amplitudes of response that are being analyzed, and values of frequency and damping for each of the analyzed amplitudes are assembled and presented in a chart such as shown in FIGS. 12A, 12B and 13.

Figure 12A:
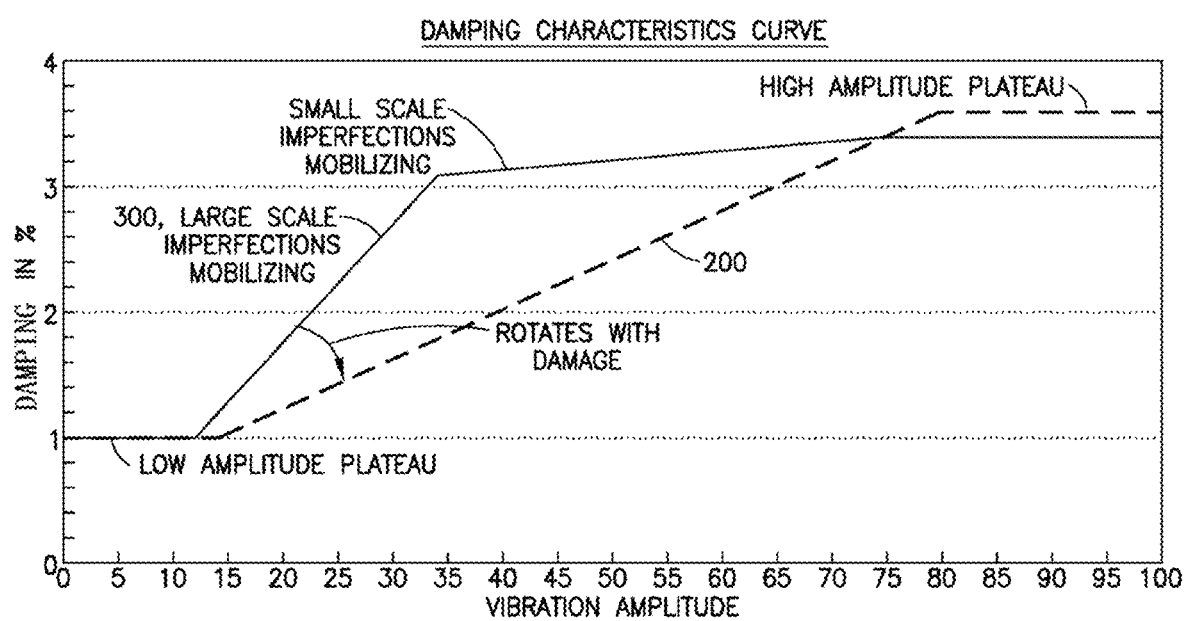
FIGS. 12A and 12B depict damping characteristic curves of an exemplary structure.
Figure 12B:
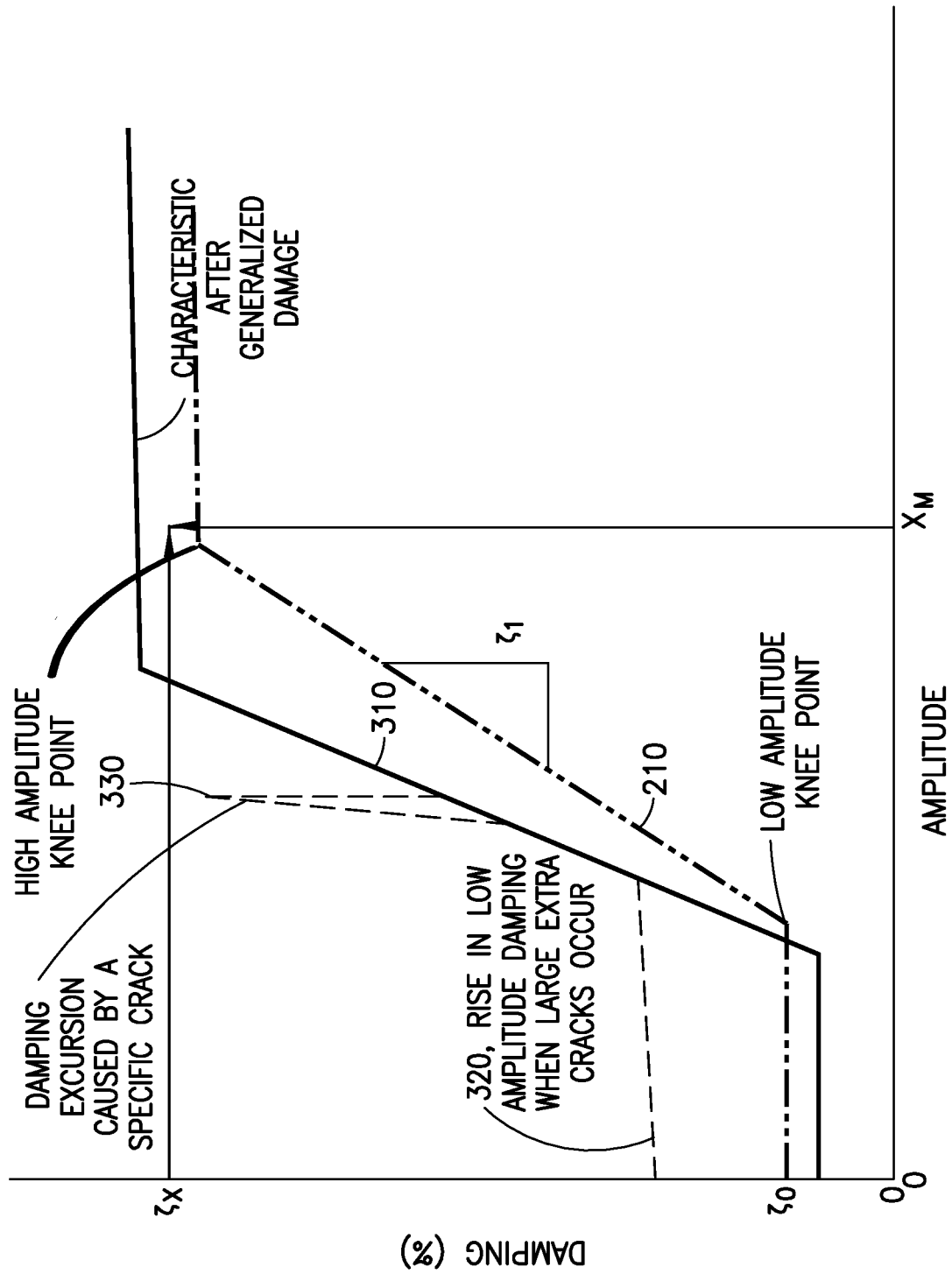

FIG. 12A graphically shows a theoretical damping response for a mode of vibration for a monolithic structure. For the theoretical condition, indicated by line 200, damping is expected to start at a low amplitude plateau (i.e., low amplitude of the incident vibration), and to increase as the vibration amplitude increases until the damping reaches a high amplitude plateau. If the structure is damaged, indicated by line 300, the slope between the low amplitude plateau and the high amplitude plateau will change, as will the low and/or high amplitude values. This can be seen more clearly in FIG. 12B, with damping in the "undamaged" structure indicated by line 210, and damping in the "damaged" structure indicated by line 310. Indications of more extensive damage are represented by a significant increase in the low amplitude value, as indicated by 320, and/or in spikes in damping, also referred to as "damping excursions," as indicated by 330.

Figure 13:
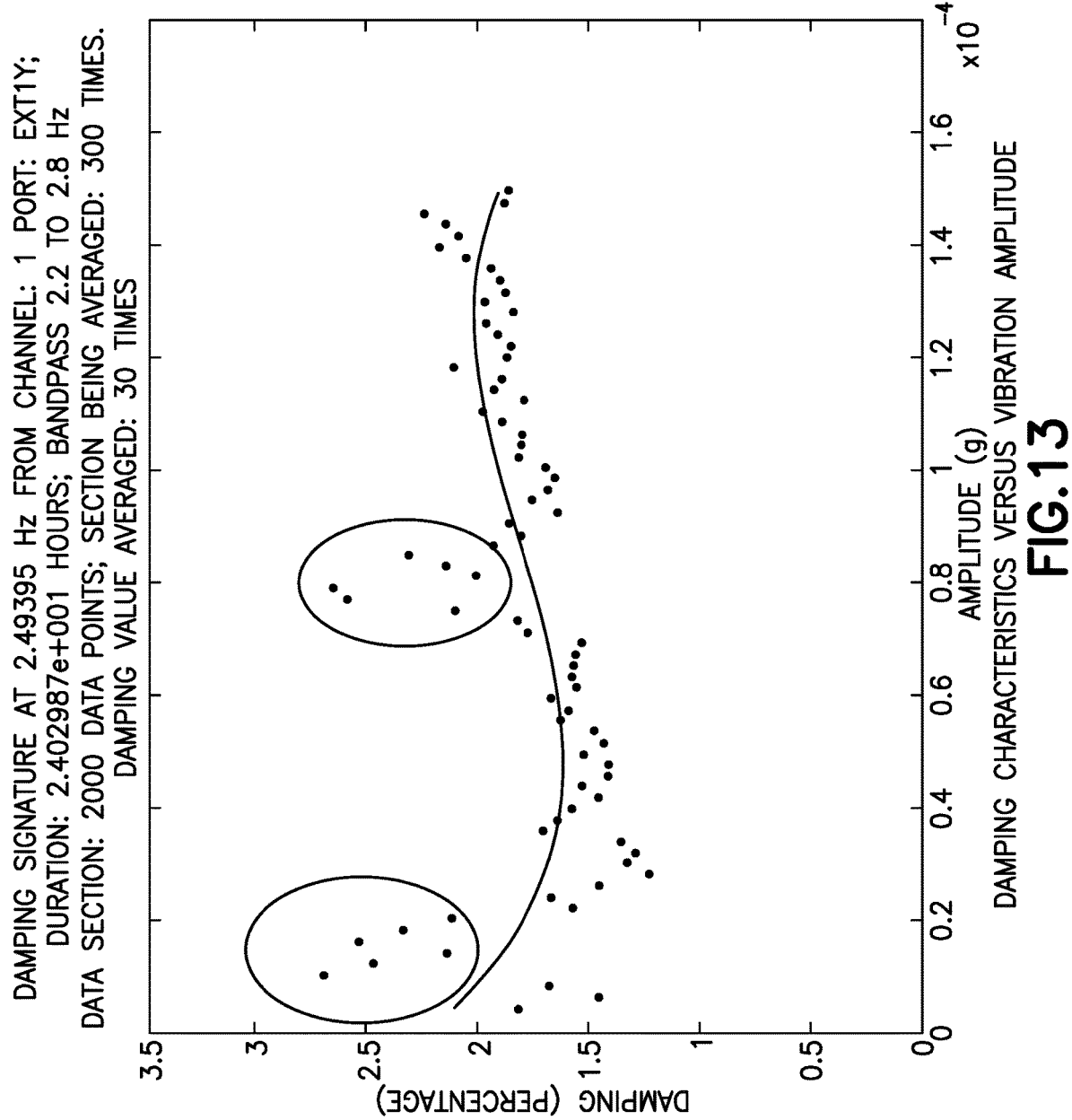
FIG. 13 depicts damping characteristics versus vibration amplitude of an exemplary structure.

FIG. 13 shows a damping versus amplitude curve from a structure using the RANDEC algorithm. There is a change to the damping response as the amplitude of vibration increases. Additionally, there are peak excursions (circles) which correlate with damage within the matrix of the structure. Establishing the measured damping response and how it changes with amplitude is an important aspect of the analysis provided by the present invention.

Vibration intensity is calculated using seismic devices such as accelerometers and seismographs. The vibration intensity can be computed into a velocity value, and is often described as peak particle velocity (PPV), a measure used extensively for the assessment of vibration intensity and is generally high amplitude data caused by forces. Peak particle velocity is one of the outputs from the analysis of the data acquired by the sensors 50. In the construction industry, or other industries where vibration intensity is measured, vibration limits are often set using PPV as the measure. When PPV is assessed using this methodology it can be used for assessing the value at low frequencies (i.e. below 2 Hz).

The time history data acquired by the present invention (see, e.g., FIG. 3) can be converted to peak particle velocity using basic mathematical computations and generally available tools and methods. This is an important level of information to provide since it is so readily recognized within the various industries where vibrations are a concern. The time history can also be converted into many additional parameters which are relevant to the structure. Parameters such as tilt, relative displacement and other standard computations are used and may be relevant to the structure. These parameters can come from both the high and low amplitude data. Through additional scripts, these parameters can be an output of the system 10.

As discussed, the spectral response, mode shape and non-linear damping characteristics of a structure are determined using the analyses described above, so that values appropriate for comparison with code required values can be used. Equation 1 can be used for the as-is (i.e., measured) and as-designed conditions. The ratio of these values can then be expressed as a probability of occurrence of failure of the structure, i.e., a risk ratio. Since modern codes of practice define design forces with a probability of occurrence, the present invention calculates the probability of occurrence of an event (i.e., a force) that would result in the performance required by design, and quantifies a future risk of failure of the structure in response to that event.

The risk ratio processor 40 of the present invention utilizes data from the data processing module 30. The frequency spectra, mode shape(s), and non-linear damping characteristics determined by the data processing module 30 are used in conjunction with the measured non-linear response to accurately calculate the response of the structure in its first or fundamental mode. For buildings, this is called the first bending mode and is the mode of vibration which is generally analyzed during design for determining the wind load capacity under applicable building codes. Therefore, the response of the structure can be accurately calculated with the determined characteristics in the following manner.

Figure 21:
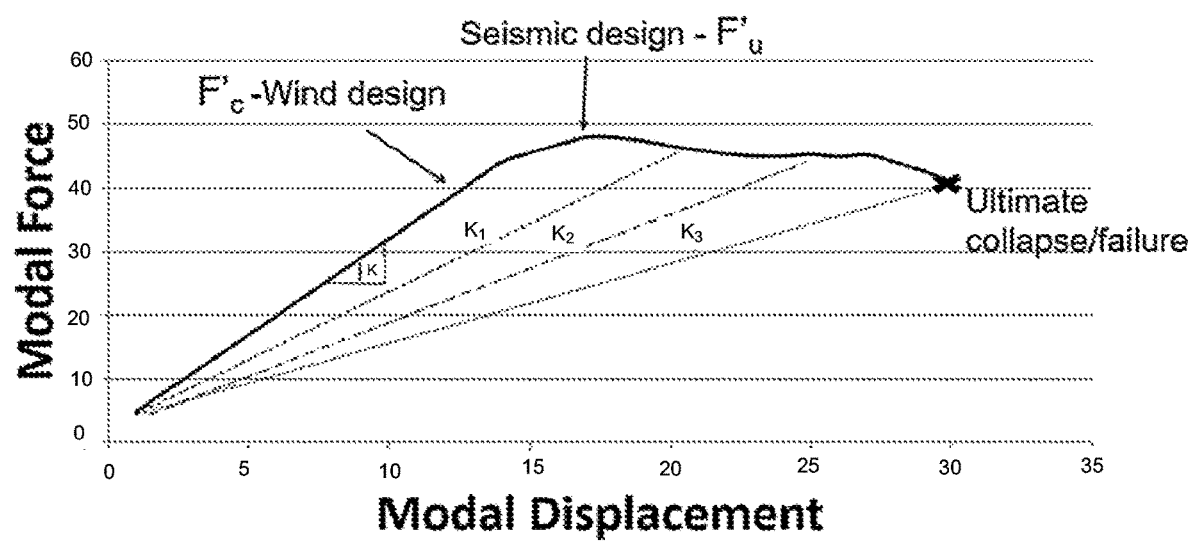
FIG. 21 depicts a force-displacement curve.

From Equation 1, Equation 2 is derived to define displacement per unit force, this relationship also being generally depicted in FIG. 21.

$$\frac{X_r}{F_r} = \frac{1}{8f_r^2 \zeta_r M_r \pi^2} \qquad \text{Equation 2}$$

Of the five original parameters (i.e., displacement X, unit force F, frequency f, damping $\zeta$, and modal mass M), Equation 2 reduces the unknowns to three—frequency, damping, and modal mass. The modal mass does not change inside the elastic range of the structure, because it is based on the total mass of the structure and the deflected mode shape, which also does not change inside the elastic range. Thus, there remain two unknowns—frequency and damping—that can be measured directly (as discussed above), and used to extrapolate up for corresponding values for the elastic limit, or the design condition; the elastic limit being an upper or lower boundary of the elastic range.

Although frequency and damping change with amplitude, they change in a way that can be measured. Measurements of frequency and damping within the elastic range, and considering the rate of change with amplitude, can be extrapolated from the condition that was measured (i.e., the as-is condition) up to the design condition (i.e., the as-designed condition). This involves assessing the probability of an event taking the structure to the as-designed amplitude, and comparing it with the force that the design assumed.

With reference again to FIG. 12B, measurement and calculation of non-linear damping will be further discussed. Equation 3 defines low amplitude damping.

$$\zeta_0 = 0.76 f_0 \qquad \text{Equation 3}$$

Where $\zeta_0$ is the low amplitude damping expressed as a percentage of critical damping and $f_0$ is the fundamental natural frequency of the structure 100. Critical damping is defined as that amount of damping that will just prevent a system from oscillating. This condition is known as dead beat. The actual amount of damping in civil engineering structures is much smaller, and is normally expressed as a ratio of the actual damping to the critical damping (and is often expressed as a percentage).

Equation 4 may be used to determine the rate of increase of damping.

$$\zeta_I = 10^{\frac{\sqrt{D}}{2}} \qquad \text{Equation 4}$$

Where D is a base dimension of the structure 100 in the direction of the vibration and $\zeta_1$ is the rate of change of damping expressed as percent per millimeter. The value of D may be modified to account for attached buildings or large open spaces in the structure.

In Equation 5, the value of $\zeta_x$ is the value to which damping rises at amplitude x. H is the height or length of a horizontal structure (such as a bridge), and $X_H$ is the displacement amplitude at H on the structure. The value of $X_H$ may be the value of displacement specified as a value in a building code.

$$\zeta_x = \zeta_0 + \zeta_I \left[\frac{X_H}{H}\right] \qquad \text{Equation 5}$$

The point at which the graph of the damping characteristic of FIG. 12B transitions from low amplitude to rise, and from rise to high amplitude, is referred to as a knee point, i.e., a low amplitude knee point and a high amplitude knee point. The knee point is specified in terms of the force acting on the structure. It is dependent on the dimensions of a structure and of the basic material of which the structure is constructed as follows:

$$F_{cl} = J_t DH$$

where $F_{cl}$ is the modal force acting on the structure that causes it to enter the non-linear zone where $\zeta_1$ applies. D and H are as defined above.

The low amplitude knee point and high amplitude knee point may be calculated with Equations X and X', below.

$$X_{rL} = \frac{0.25 DH}{8\pi^2 f^2 M_r \zeta_L} \qquad \text{Equation X}$$

$$X_{rH} = \frac{2500 DH}{8\pi^2 f^2 M_r \zeta_H} \qquad \text{Equation X'}$$

The values of 0.25 and 2500 are the Jeary coefficients and have been established from a consideration of fracture mechanics. This means that the amplitude at the high amplitude knee point is 1000 times larger than the low amplitude knee point modified by the ratio of damping at the high amplitude to that at the low amplitude. The rate of rise of damping is proportional to the amount of participating mass in the mode of vibration. This rate is also published, and is variously ascribed slightly different values in Japan. The value of damping at low amplitude is ascribed by a value that is correlated with the frequency of the mode of vibration. The curve then rises in a manner given by the equations above. There are two unknowns—the high amplitude knee point and the damping at that amplitude. The present invention uses an iterative process to establish these values with a check on the operation of the equation at the low amplitude to make sure that the low amplitude damping value is consistent.

The low knee point Jeary constant, $J_1$, takes a value of 0.5 for a concrete structure and 1.25 for a steel structure. The high knee point Jeary constant, $J_H$, takes on values of 250 for concrete and 625 for steel.

Figure 14:
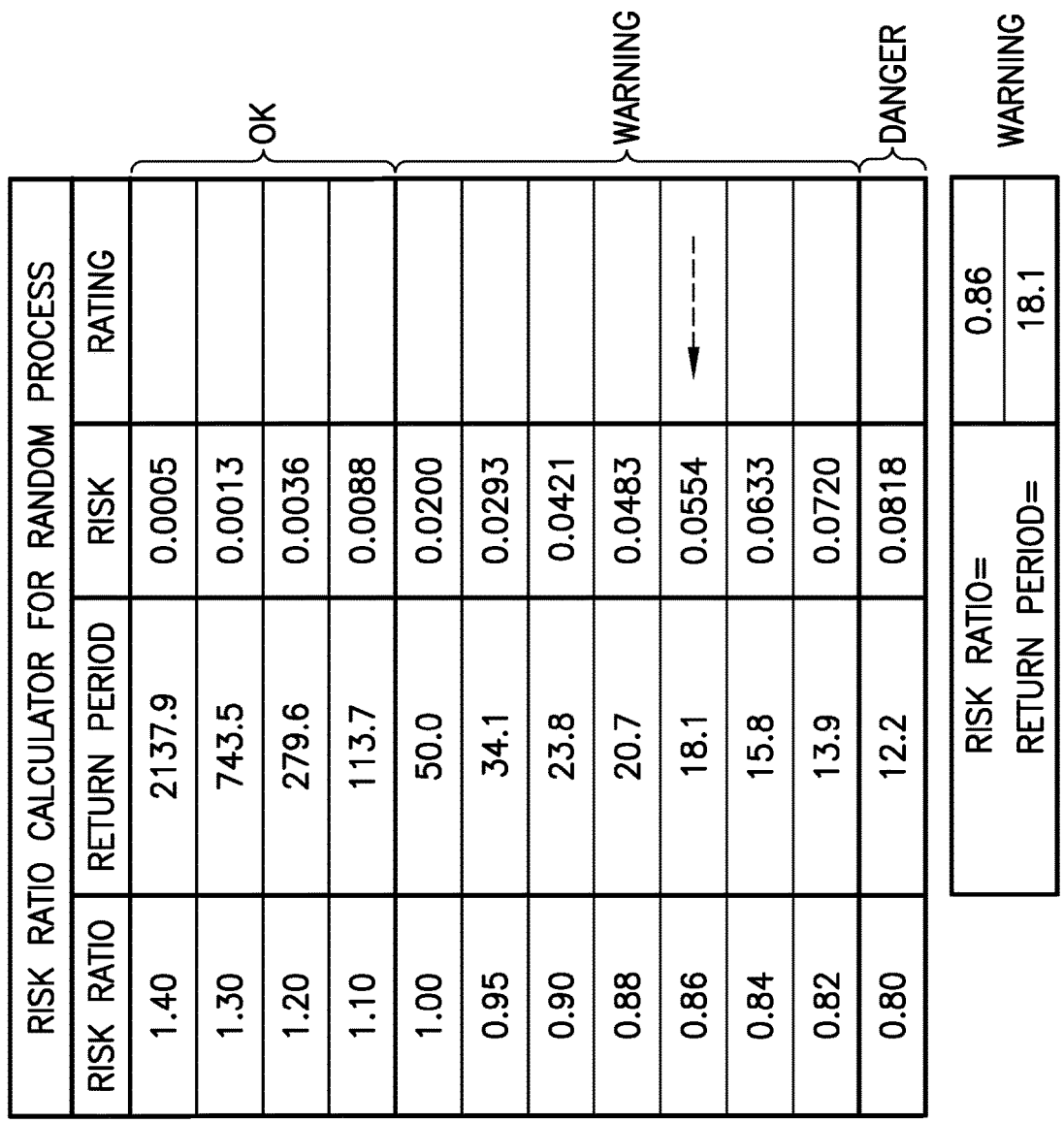
FIG. 14 is an exemplary table of risk ratios and a rating indicating a level of risk.

Considering the foregoing, the data processing module 30 determines an as-is condition of the structure 100, which is compared with an as-designed condition by the risk ratio processor 40 to determine a risk ratio of the structure 100. Modern codes of practice use a force associated with a type of action (e.g. wind or earthquake), and specify the minimum return period allowable for the actions that occur in different areas. For example, in the New York region, the wind that occurs just once in fifty years has a mean speed of 115 miles per hour, at a height of 32 feet. The risk ratio can then be used to assess and quantify the probability of occurrence of an event that would take the response of the structure out of the elastic range, or to assess the change necessary to the modal properties of a structure, that would allow it to comply with current code requirements. An exemplary table of risk ratios is depicted in FIG. 14, along with rating indicating a level of risk. This can also be used to compare the current capacity of the structure with the current code requirement in the particular location where the structure is, which has its specific codes. This risk ratio allows for the comparison of different types and sizes of structure based on their risk profile.

In practice, use of the present invention comprises the following steps: determining the as-designed condition of the structure using the local code of practice to determine the design load of the structure; using the local code to estimate the probability of occurrence of the design load; measuring the dynamic response of the building; using Equation 1 to establish the displacement/unit force of the fundamental mode; extrapolating from the measured dynamic response to the reference displacement to determine the as-is condition; determining a risk ratio from the as-designed condition and the as-is condition; determining the return period of the event that takes the measured response to the reference displacement; and optionally plotting against a bell curve that includes the code risk required.

Figure 18A:
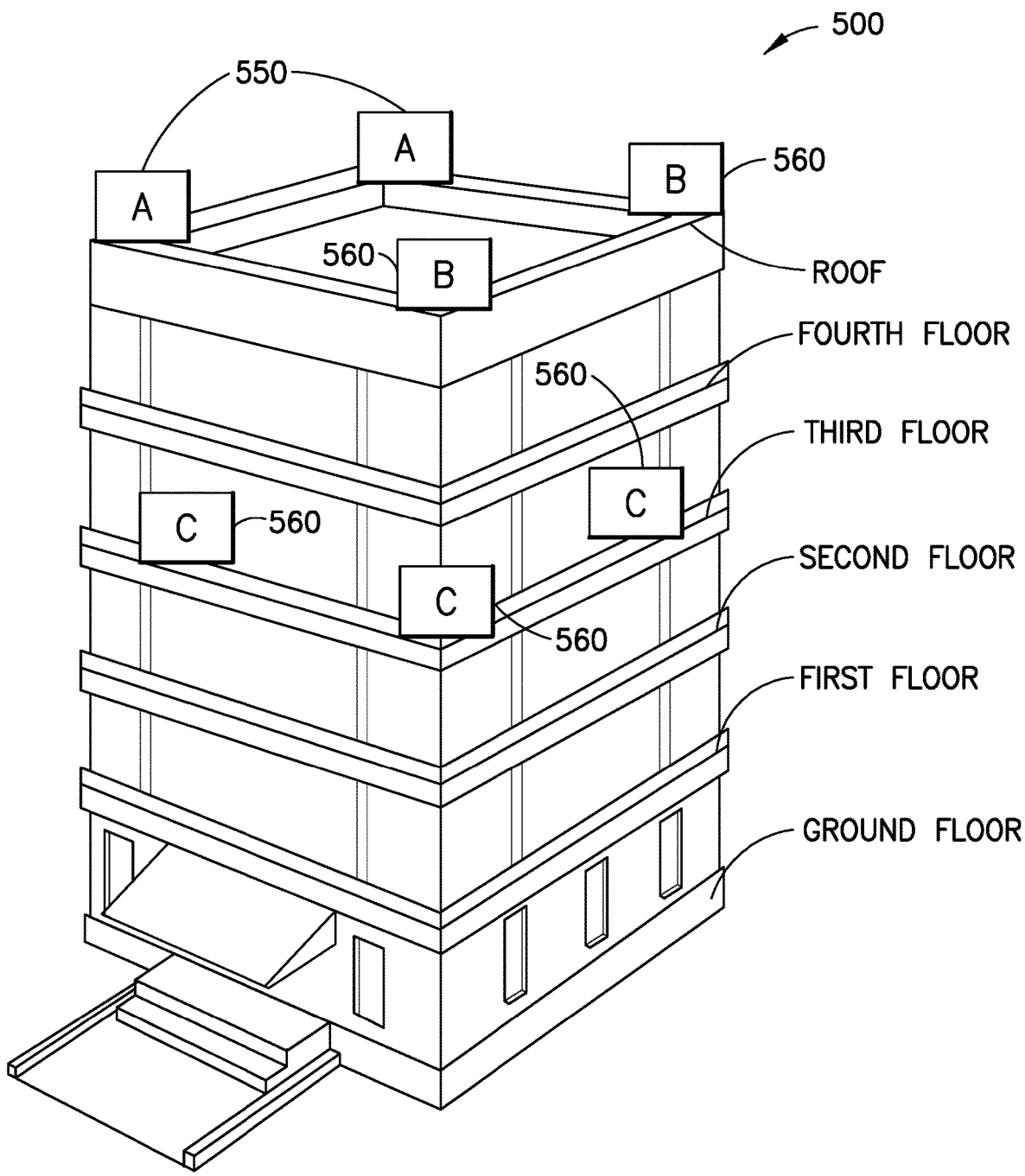
FIGS. 18A and 18B depict the location of sensors in/on an exemplary building and bridge, respectively, for determining the dynamic response of the building in accordance with embodiments of the present invention.

Use of embodiments of the present invention will now be described in the context or a multi-story, generally monolithic building, as depicted in FIG. 18A. As a preliminary step, the expected dynamic performance of a "pristine" structure, i.e., one built to applicable code and design specifications, is determined by first estimating the fundamental frequency and damping characteristics of the building. The frequency is predicted for a tall building, based on the height only of a tall building (f=46/H), where H is the height of the building. Code requirements differ from one location to the next, and the foregoing, while applicable for most locations, does not apply for Japan, where the equation to estimate the fundamental frequency of a building is f=50/H for reinforced concrete, and f=66/H for steel frame structures. These values of frequency do not change much with increasing amplitude. The same type of heuristic applies to other structures. For example, the equation to estimate the fundamental frequency of a bridge is f=800 $(L_s)^{-0.9}$, where $L_s$ is the length of the span.

To estimate damping, the starting point is that the low amplitude damping is correlated with the frequency (of the fundamental mode). In contrast with estimating the fundamental frequency, where increasing amplitude is not a factor, the rate of increase of damping increases by increasing amplitude. To estimate damping, the following need to be determined: the low amplitude damping characteristic (correlated with frequency); the low amplitude knee point (Equation X); the rate of rise of the damping characteristic (Equation 4); and the high amplitude knee point (Equation X').

What remains is to use the measured and expected values for dynamic response of the building at a similar amplitude, e.g., an amplitude for which the building was designed. Measured values can be extrapolated to this amplitude and compared with what is expected.

Once the as-designed condition is determined, the as-is condition is next determined. In other words, the as-is dynamic response of the building is measured and calculated. The building 500 has a plurality of floors, including a ground floor, first second, third and fourth floors, and a roof. A plurality of sensors is placed at a plurality of locations in the building 500, and connected to the data collection module 20. Data collection is conducted during the occurrence of an event that may be man-made or natural. Reference sensors 550 are placed on the roof at location A, and traveler sensors 560 are placed at various locations of the building 500 over a defined time. Two traveler sensors 560 are first placed on the roof at location B, and data collected by the data collection module 20 from each of the reference sensors 550, and each of the two traveler sensors 560 for a defined time. This data is stored as a digital record 300 by the data collection module 20 in memory 84. These traveler sensors 560 are then placed at location C, plus three additional traveler sensors 560 at the same location. Data from the reference sensors 550 and the traveler sensors 560 is again acquired by the data collection module 20 over a defined period and stored as a digital record 300 by the data collection module 20 in memory 84. This process is repeated until data collection is completed. Alternatively, the reference and traveler sensors 550, 560 may be placed at a location and not moved for the duration of data collection, in essence completely "wiring" the building 500 with sensors at every location at which data collection is desired, and collecting and storing data in accordance with embodiments of the present invention for a defined period of time.

Figure 18B:
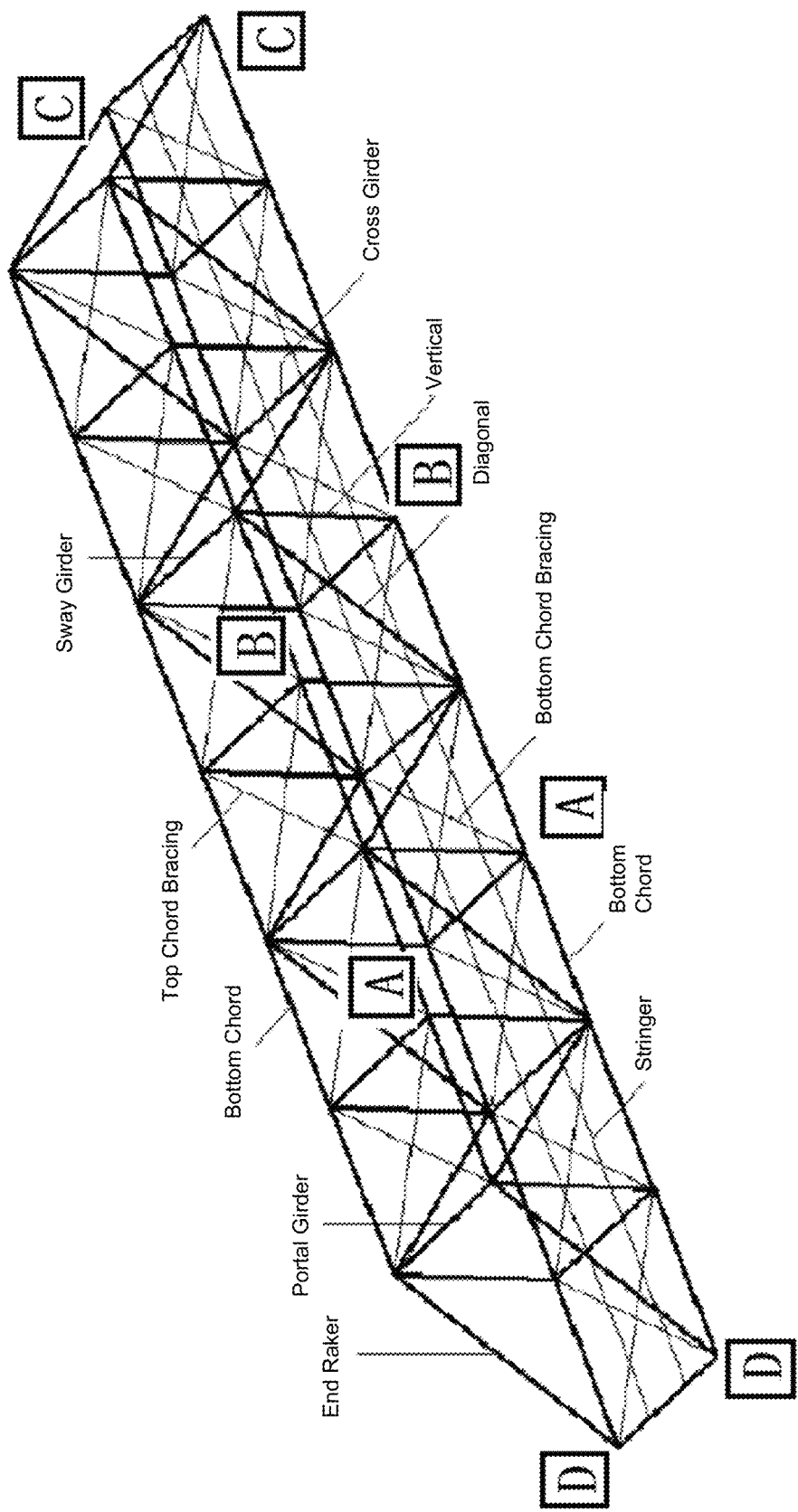

FIG. 18B illustrates an example where the measured structure is a bridge. In some embodiments, sensors (e.g., reference sensors and travel sensors) can be placed at various locations (A, B, C, D) of the bridge structure to obtain data in a manner similar to that discussed above with regard to the building structure shown in FIG. 18A. As is known to those of skill in the art, bridge structures can be formed of multiple components, such as top and bottom chords, top and bottom chord bracing, sway, cross and portal girders, end rakers, and vertical and diagonal members.

Once data collection is complete, the data processing module 30 determines frequency spectra, mode shape, nonlinear damping characteristic, and an as-is condition of the building 500. The displacement per unit force of the fundamental mode of the building is determined using Equation 2. However, the following are important considerations when calculating this parameter:

1. Equation 2 has been calibrated under induced vibration conditions for full-scale structures. In this case the modal mass of an entire structure was calculated at different amplitudes of response, under conditions of changing damping and frequency;

2. The practical accuracy of the equation from measurements is better than 5%;

3. The response is not assumed to be linear elastic. Damping is assumed to follow the model defined by T. A.

Wyatt is the paper titled "Mechanisms of Damping," submitted for Proceeding of a Symposium of Dynamic Behavior of Bridges at the Transport and Road Research Laboratory, Crowthorne, Berkshire, England, May 19, 1977, the entire disclosure of which is incorporated herein. Under this circumstance linear elastic behavior is a mathematical convenience that allows simplifications to be made, but that does not address the underlying physics;

4. The value of $X_r/F_r$ approximates a straight line and is a proxy for the modal stiffness. As such this ratio can be obtained from anywhere in the so-called "linear-elastic range." However, the values of damping and frequency change with amplitude and so values that are referenced to a particular amplitude must be chosen. This is termed the "reference amplitude;"

5. The definition of strength is defined as a point on the force/displacement curve at which some criterion is met. Strength can be applied at one of the force/amplitude thresholds, such as yield strength, compressive strength, tensile, compressive, or impact, depending on the type of force applied to a material or a group of materials such as a structure.

Figure 20:
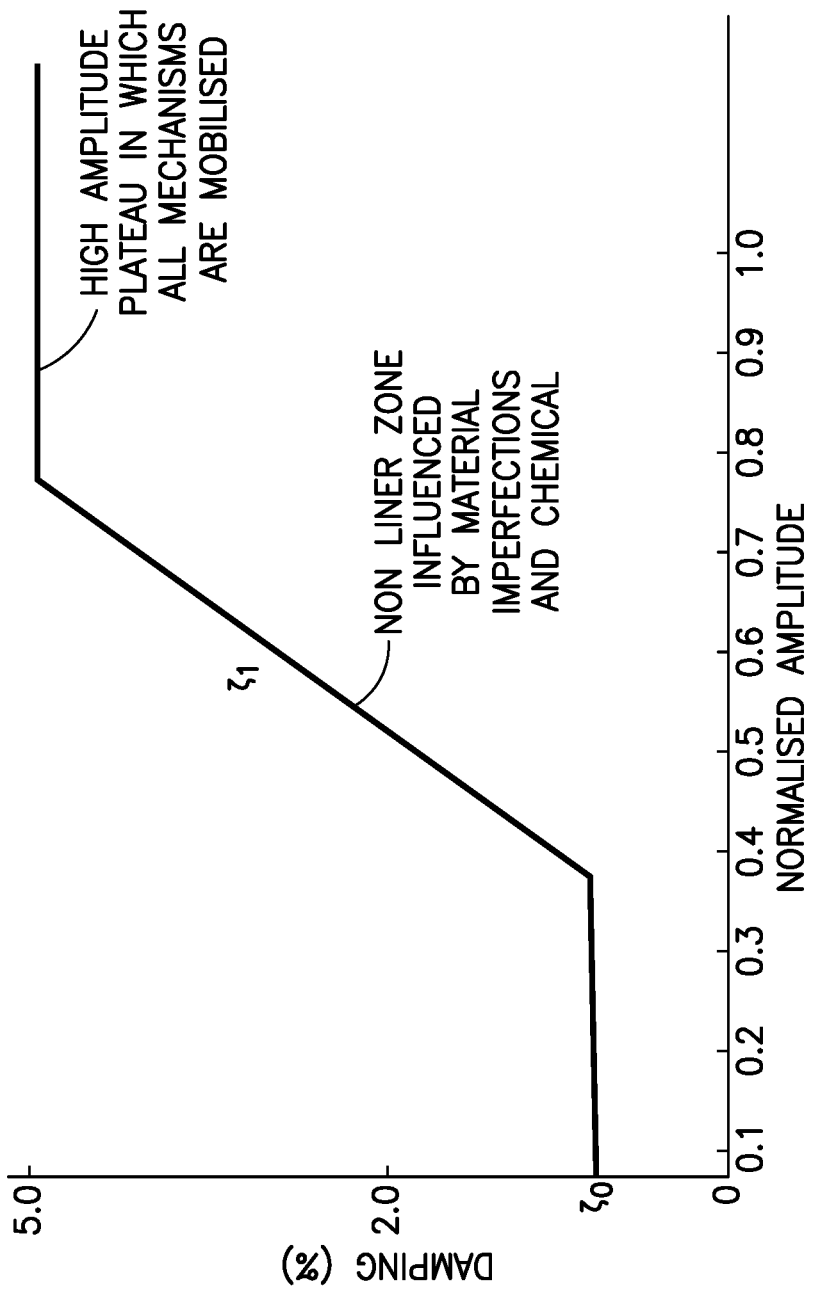
FIG. 20 depicts a damping characteristic curve.

Once the measured dynamic performance is determined, i.e., the frequency spectra, mode shape, non-linear damping characteristic, extrapolation of these to the reference amplitude is dependent on establishing the non-linear characteristics of frequency and damping for the mode of vibration used. Frequency is relatively straightforward, but the measurement of non-linear damping characteristics has, until quite recently, been too difficult to attempt. The extrapolation of damping assumes that fracture mechanics requires a characteristic for damping/amplitude as indicated in FIG. 20, as described in the paper titled "On stick-slip phenomenon as primary mechanism behind structural damping in wind-resistant design applications" by Aquino and Tamura, published in the Journal of Wind Engineering and Industrial Aerodynamics, volume 115 (2013), pages 121-136, the entire disclosure of which is incorporated herein. It can be seen that there is a limiting value of damping, but it is important that this generalized characteristic applies to undamaged structures. All parts of this damping curve are amenable to prediction for an undamaged structure. For a damaged structure, fracture mechanics can be used to assess the actual measured characteristic and for signs that differences from the undamaged state can be attributed to specific mechanisms (such as cracking for instance). The rate of change of damping is measured by using algorithms based on the RANDEC method.

Displacement per unit force for each of the as-designed and as-is conditions is calculated using Equation 2 with parameters applicable to each condition. For the as-designed condition, Equation 7, below, is used.

$$\frac{X_{rd}}{F_{rd}} = \frac{1}{8 f_{rd}^2 \zeta_{rd} M_{rd} \pi^2} \quad \text{Equation 7}$$

For the as-is condition, Equation 8, below, is used.

$$\frac{X_{rm}}{F_{rm}} = \frac{1}{8 f_{rm}^2 \zeta_{rm} M_{rm} \pi^2} \quad \text{Equation 8}$$

From these questions, a risk ratio of the structure is determined using equations 9 and 10, below.

$$\frac{F_{rm}}{F_{rd}} = \frac{8 f_{rd}^2 \zeta_{rd} M_{rd} \pi^2}{8 f_{rm}^2 \zeta_{rm} M_{rm} \pi^2} \quad \text{Equation 9}$$

For building structures the mass M does not change. In addition, for bridge structures, since the data can be separated into low amplitude and high amplitude, and the analysis is focused on using the low amplitude data, which removes the influence of vehicle traffic (as discussed in further detail below), the mass M also does not change. Further, the reference displacement is used as the design requirement and for the extrapolation point from measurements. Because, the rate of rise of the displacement per force characteristic approximates a straight line which is the modal stiffness, then it is only necessary to evaluate these parameters in the linear elastic range. Thus, Equation 10 establishes the ratio of forces necessary to reach the reference amplitude for the design case compared with the measured case.

$$\frac{F_{rm}}{F_{rd}} = \frac{\zeta_{rd} f_{rd}^2}{\zeta_{rm} f_{rm}^2} \quad \text{Equation 10}$$

An exemplary risk ratio calculation is depicted in the table of FIG. 19 for a wind excitation event. Expected (as designed) and measured (as-is) frequency and damping are depicted in columns A and B. Column C is the percentage difference between the as-designed and the as-is conditions. The risk ratio is calculated as the ratio of the percent of designed stiffness of Column D and the percent of expected damping of Column C, multiplied by a local design code factor of 1.4, resulting in a risk ratio of 99% (Column E). Local code (in this example) requires a 500-year return period. The calculated risk ratio results in a return period of 451.75 years (Column F) (Calculated with Equation 11), resulting in an annual probability of occurrence of 0.22% (Column G).

Return Period=$e$(Risk Ratio$^2$)(5 log$_e$(500)))−5     Equation 11

Probability

In certain embodiments, such as when the measured structure is a bridge, alternative calculations related to loading can be used as an alternative or supplement to the use of a return period.

Probability of occurrence in any year is 1/(return period) expressed as a percentage.

The present invention then determines the return period of the event that takes the measured response to the reference displacement using Equation 12, where R is the required return period, $S_T$ is the ratio of the measured response to the elastic limit response, and ln is the natural logarithm.

$$S_T = \sqrt{\frac{5 + \ln R}{5 + \ln(50)}} \quad \text{Equation 12}$$

The present invention will now be further described with reference to FIGS. 15-18B. At a high level, a method in accordance with embodiments of the present invention comprises: acquiring data of the structure 100 from a plurality of locations of the structure, step 400; separating low amplitude data, step 401; determining dynamic response characteristics of the structure, step 402; determining an as-is condition of the structure 100, step 404; determining a risk ratio of the structure, step 406; and determining a return period, step 408. Step 401 is discussed in further detail below. In some embodiments, step 401 may not be used.

Figure 15:
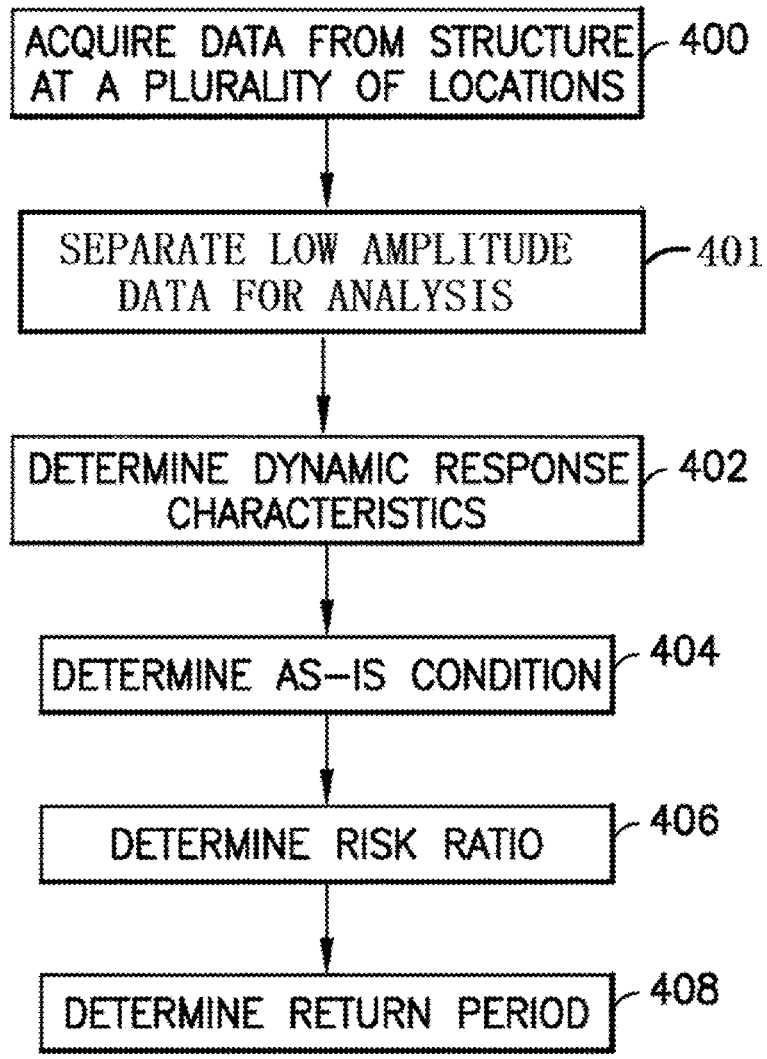
FIG. 15 is a flow diagram of a method for dynamically evaluating the condition of a structure in accordance with embodiments of the present invention.
Figure 16:
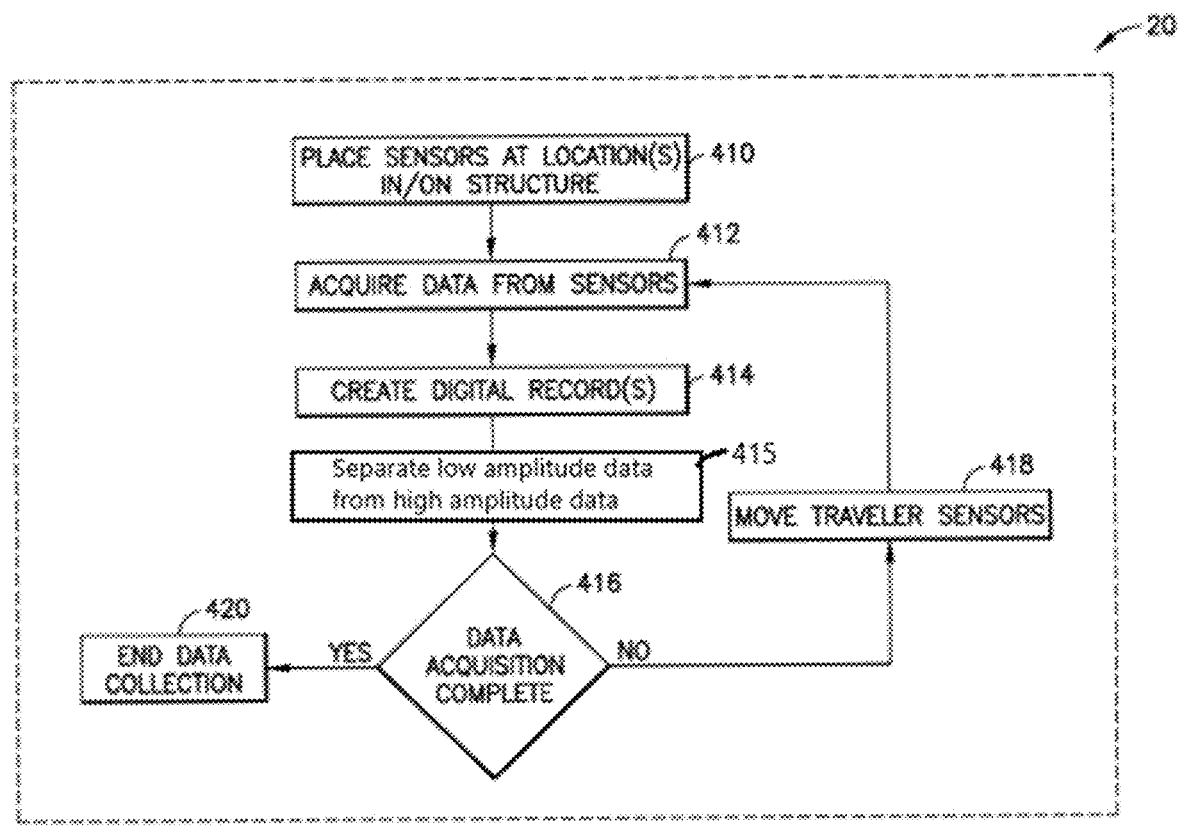
FIG. 16 is a flow diagram of data collection carried out by a data collection module in accordance with embodiments of the present invention.

With reference next to FIG. 16, steps 400 and 401 of FIG. 15 will now be discussed in further detail. Acquiring characteristics of the structure further comprises: placing sensors in a plurality of locations in or on the structure, step 410; acquiring data from the sensors, step 412; creating a plurality of digital records for the acquired data, step 414; separating the low amplitude data from high amplitude data, step 415; determining whether data acquisition is complete, step 416, moving traveler sensors, step 418; continuing to acquire data and create digital records, steps 412 and 414 until data acquisition is complete; and ending data collection, step 420. Step 415 is discussed in further detail below. In some embodiments, step 415 may not be used.

Figure 17:
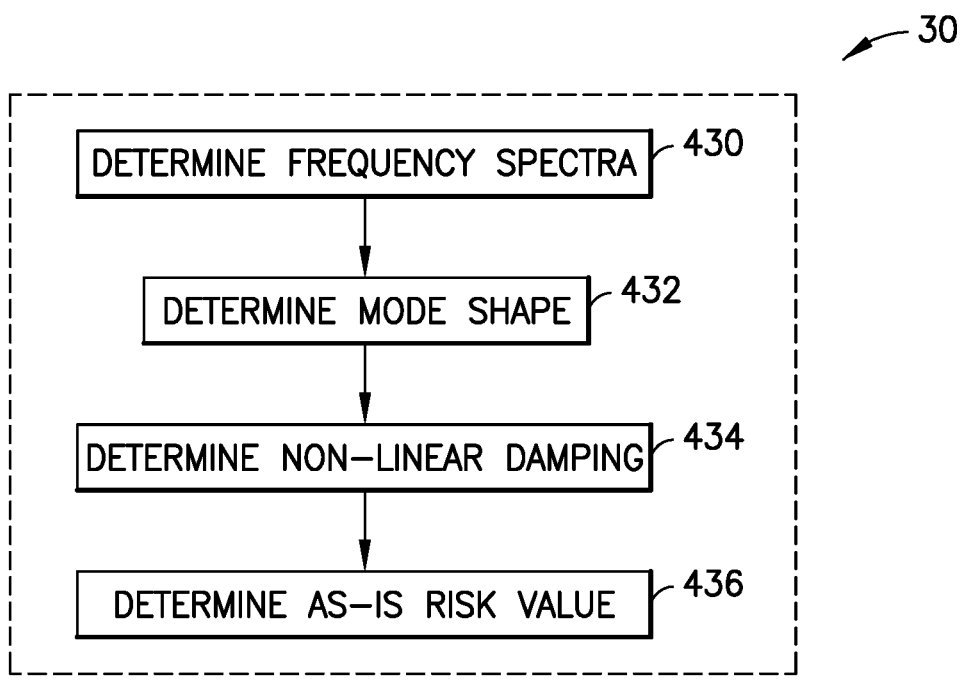
FIG. 17 is a flow diagram of data processing carried out by a data processing module in accordance with embodiments of the present invention.

With reference to FIG. 17, step 402 of FIG. 15 will now be discussed in further detail. Determining the dynamic response of the structure further comprises: determining frequency spectra using time history low amplitude data acquired by the sensors 50 and Fast Fourier Transform (see, e.g., FIGS. 3 and 4), step 430; determining a mode shape by identifying the frequencies, quantifying the relative movement of the structure at selected locations and determining the phase of motion in different parts of the structure, step 432; determining non-linear damping using a modified RANDEC that looks for and removes large and sudden deviations from the average values to remove a singularity from the response data, step 434; and determining an as-is condition of the structure, step 436.

Determining a risk ratio per step 406 and determining a return period per step 408 are discussed in detail above.

As discussed above, in a case where the measured structure is a bridge, the dynamic properties of the bridge can be more accurately measured if the impact of vehicles is not included in the measured response. To accomplish this, in some embodiments, the data can be collected with very sensitive sensors and processed with the certain appropriate algorithms to extract the dynamic properties from the inherent noise in the monitoring system.

Figure 22:
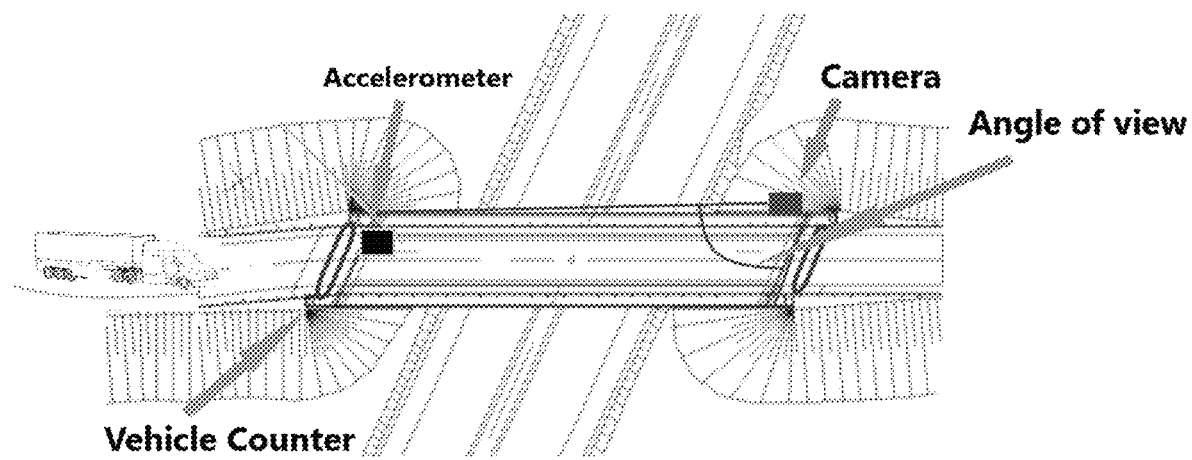
FIG. 22 depicts a bridge with devices used to determine if a vehicle has entered or exited a bridge in accordance with embodiments of the present invention.

With reference to FIG. 22, there is shown the placement of data collection devices (vehicle detection sensors) on or near a bridge to determine characteristics of vehicles entering or exiting a bridge. For example, one or more cameras can be used in conjunction with vision or image recognition system to identify the presence of vehicles. The cameras can be strategically placed with a field of view such that it can be identified when vehicles enter and/or exit the bridge. Other devices that can be placed on or near the bridge structure include optical and mechanical vehicle counters or strips, accelerometers, and other sensors capable of detecting the presence of a vehicle, as would be known to those of skill on the art. These devices are used to determine when a force is applies including vehicles are on the bridge to facilitate separating the low amplitude vibrations from the high amplitude vibrations. The data processing module receives input data, directly or indirectly, from the data collection devices, or utilizes data from the data collection devices, stored in memory. In some embodiments, the data from the vehicle detection sensors can be used in conjunction with other sensor data.

Figure 23A:
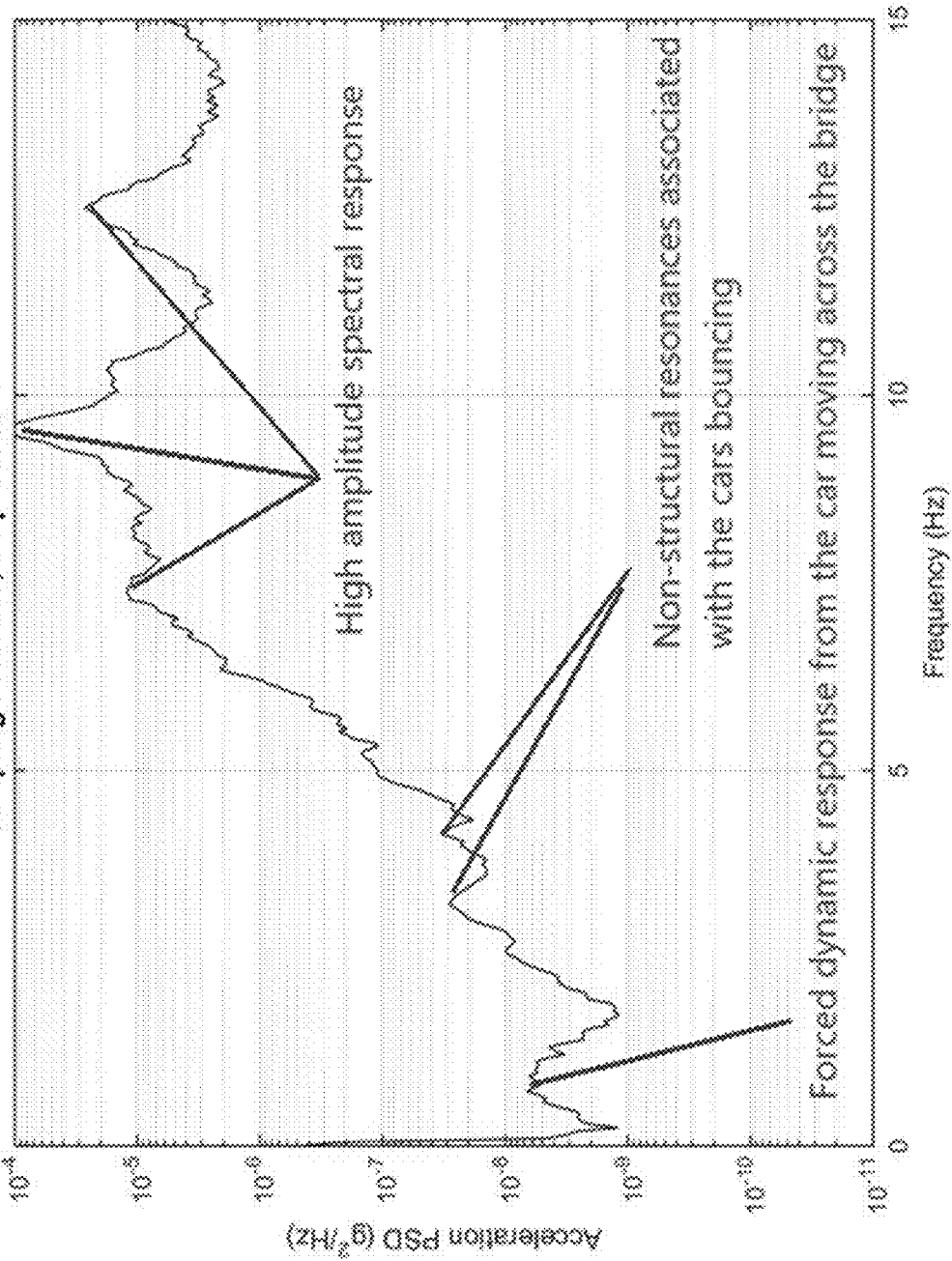
FIGS. 23A and 23 B depicts the spectral response of a bridge span in the vertical direction showing the response when the data is processed to include the effects of traffic and when the effects of traffic are removed from the data, leaving just the structural response, in accordance with embodiments of the present invention.
Figure 23B:
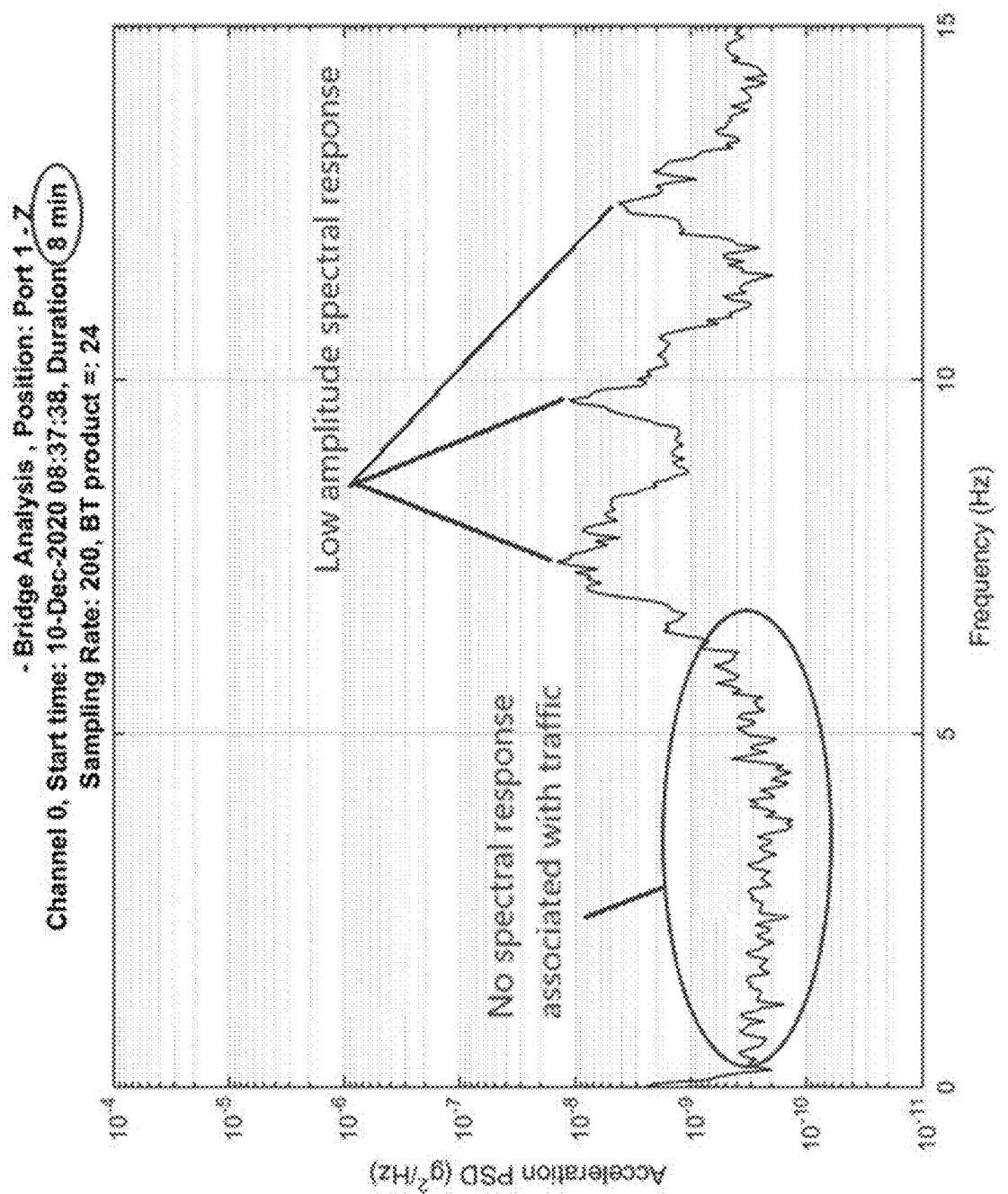

FIGS. 23A and 23B depict the spectral response of a bridge span in the vertical direction showing the response when the data is processed to include the effects of traffic (FIG. 23A) and when the effects of traffic are removed from the data (FIG. 23B), leaving just (or primarily) the structural response, in accordance with embodiments of the present invention.

The spectral response, measured as discussed above, shown in FIG. 23A is a mapping of Acceleration PSD ($g^2$/Hz) over Frequency (Hz). As used herein, the term PSD (Power Spectral Density) is related to a process of converting an acceleration time history into the frequency domain. Information related to the sampling includes a sampling start time, sampling end time, sampling duration, sampling rate, and BT product. For the plot shown in FIG. 23A, the duration is 37 minutes, the sampling rate is 200 (samples per second), and the BT product is 111. The shown frequency range is from 0-15 Hz. Notable portions of the spectral response shown in FIG. 23A are a portion of forced dynamic response from a car moving across a bridge, non-structural resonances associated with the cars bouncing, and portions of high amplitude spectral response.

The BT product is a measure of the size of random errors in the estimation of a spectrum. B is the analysis bandwidth and T is the length of record of random process, such as the dynamic response of a structure to a random process such as wind or earthquake excitation.

The square root of the inverse of the BT product is a calculation of the variance errors present in a spectrum. An analysis in view of the BT product can be performed as follows.

In some circumstances, a good rule of thumb is to aim for a BT product of 100, which, in turn, represents a confidence interval of 10% around the estimation of the mean response at any particular frequency. To start the analysis. the choice of the analysis bandwidth is made. In general, the maximum acceptable value is that the analysis bandwidth should result in four estimates of response within the half power bandwidth of a resonance response. If this bandwidth is chosen then the bias error is limited to 4%.

The half power bandwidth is the frequency distance between the two points of a resonance response in which the amplitude of response is 0.707 times the maximum amplitude of the resonance. Further, structural dynamics analysis shows this half power bandwidth to be $2 \times \zeta \times f$.

Thus, if we set BT=100 then the time necessary to record the response for analysis becomes: $T=200/(\zeta \times f)$. By way of example, for a system with a resonance at 2 Hz and with 2% damping gives a requirement for the length of time of record necessary is: $T=200 \times 100/(2 \times 2)=1.39$ hours.

In addition, the length of record required, does not have to be continuous, and techniques such as ensemble averaging are justified so long as the assembled record is stationary (meaning that statistical properties remain invariant with time). The second requirement is that the ensemble must not introduce Fourier components into the spectrum analysis. Such a situation arises when there are sudden changes in amplitude at the interface of adjacent records used for the ensemble, such as when high amplitude data from vehicle traffic is adjacent to low amplitude data from the dynamic response of a bridge structure.

Figure 24:
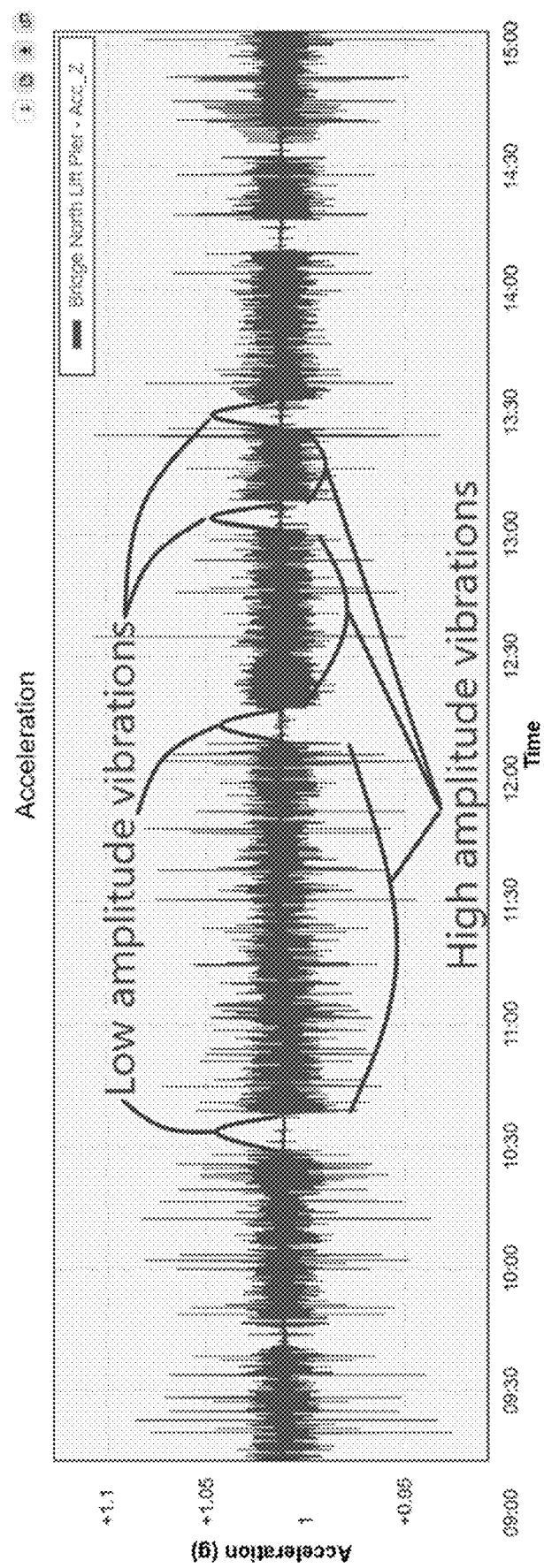
FIG. 24 depicts the time history taken from a bridge deck showing the high amplitude data reflecting the influence of traffic, and the low amplitude data reflecting the absence of the impact of traffic, in accordance with embodiments of the present invention.

With reference to FIG. 23B, there is shown another spectral response similar to that shown in FIG. 23A, but with the effects of traffic removed. For the plot shown in FIG. 23B, the duration is 8 minutes, the sampling rate is again 200, and the BT product is 24. Notable portions of the spectral response shown in FIG. 23B are a portion of no spectral response due to traffic, and portions of low amplitude spectral response. Thus, in the spectral response shown in FIG. 23B, the effects of traffic have been removed from the data, With reference to FIG. 24, there is shown a time history graph of Acceleration (g) over Time. As can be seen, the graph includes both portions of high amplitude data (acceleration) and low amplitude data. As discussed above, the high amplitude data can be attributed largely to the result of traffic, while the low amplitude data can be attributed largely to dynamic properties of the bridge structure itself. In other words, the high amplitude data reflects the influence of traffic, and the low amplitude data reflects the absence of the impact of traffic. By way of embodiments of the invention, the high amplitude data is beneficially removed, with the low amplitude data being retained and processed, In this way, the dynamic properties of the bridge can be determined and analyzed without errors introduced by the presence of vehicle traffic on the bridge.

Figure 25:
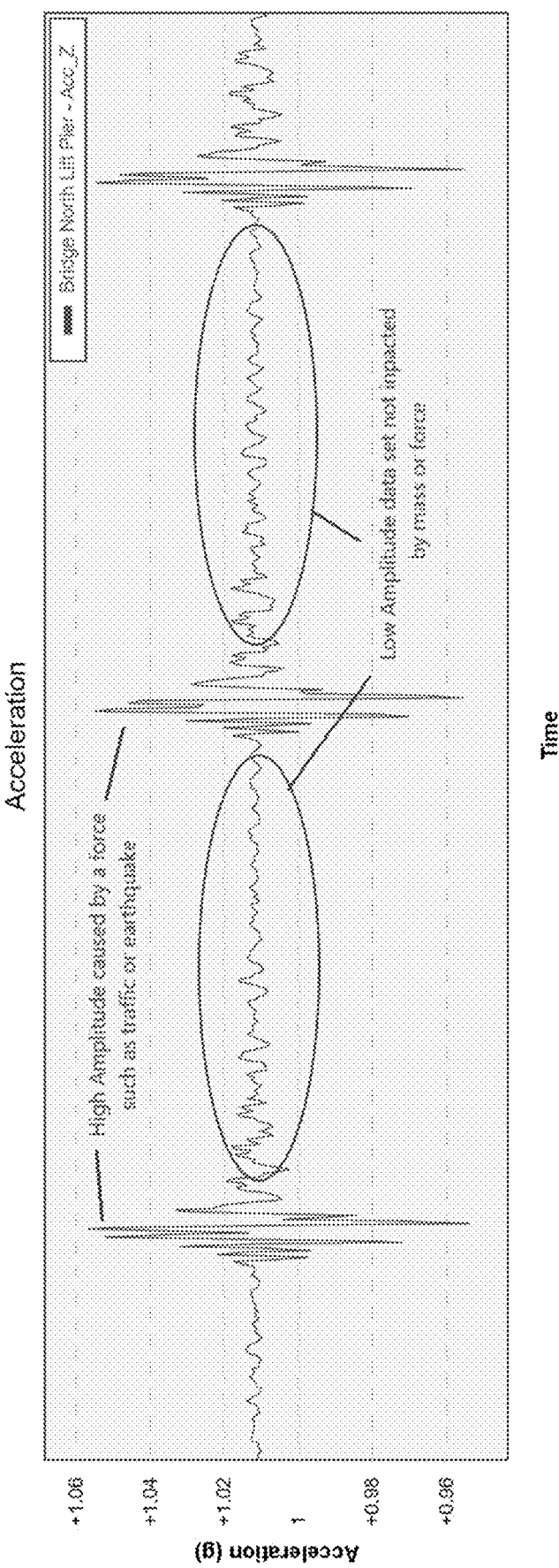
FIG. 25 depicts connecting the raw acceleration data when portions of the time history are segregated to only include low amplitude data, then connected to create a longer continuous time history which can be processed into spectral response, in accordance with embodiments of the present invention.
Figure 25:
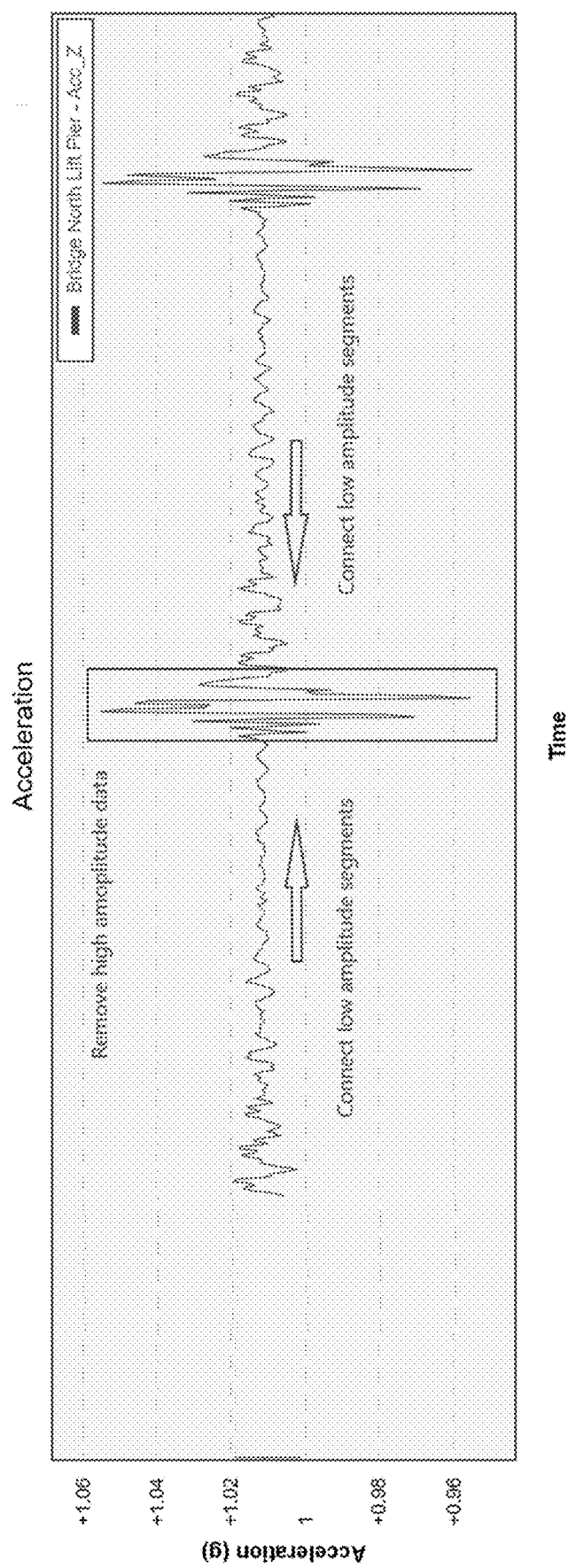
Figure 25:
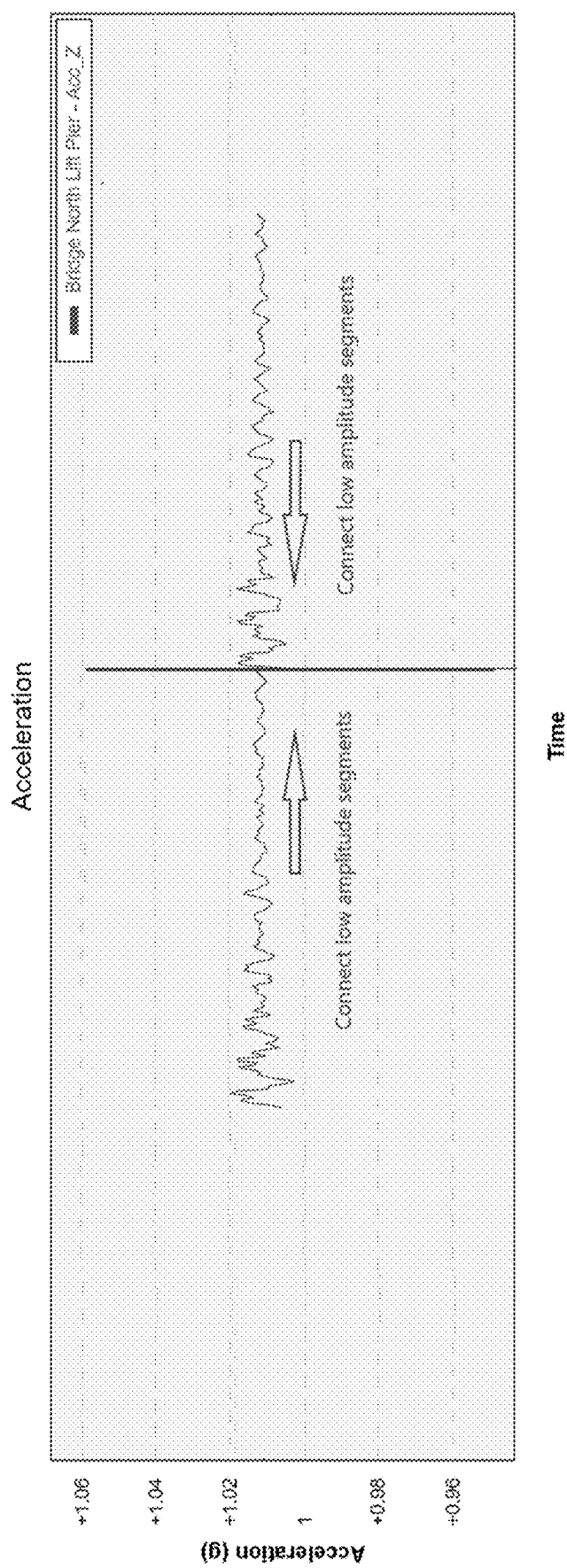

With reference to FIG. 25, there is shown a process, in accordance with embodiments of the invention, of connecting the raw acceleration data when portions of the time history are segregated to only include low amplitude data, then connected to create a longer continuous time history which can be processed into spectral response. In some embodiments, all or portions of this process can be performed by data processing module 30. In FIG. 25(a), there is shown a time history graph similar to that shown in FIG. 24. The time history graph illustrates portions of high amplitude data which could be caused by, for example, vehicular traffic. The high amplitude data could also be cause be an earthquake or similar seismic event. Also shown are portions of low amplitude data, which are typically not impacted by mass or force, and thus, more closely reflect the dynamic properties of the bridge structure itself. With reference to FIG. 25(b), the data portions of high amplitude are identified and removed from the graph data. Finally, with reference to FIG. 25(c), the remaining low amplitude segments are joined, into a continuous time history for detailed processing This process illustrated in FIGS. 25(a)-(c) can be accomplished via certain appropriate algorithms performed by computing device 80, in accordance with embodiments of the invention. In this manner, in a case where the measured structure is a bridge, the dynamic properties of the bridge can beneficially be more accurately measured because the impact of vehicles is not included in (i.e., is extracted from) the measured response.

Modifications to embodiments of the present invention are possible without departing from the scope of the invention as defined by the accompanying claims. Expressions such as "including," "comprising," "incorporating," "consisting of," "have," "is," used to describe and claim the present invention are intended to be construed in a non-exclusive manner, namely allowing for articles, components or elements not explicitly described herein also to be present. Reference to the singular is to be construed to relate to the plural, where applicable.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A system for quantifying a risk of failure of a structure in response to an event or loading of the structure being designed to withstand an event not exceeding an event limit, the structure having an as-designed condition, the system comprising:

at least one sensor placeable at a location of the structure and configured to detect movement of the structure at the location and to generate an output signal indicative of movement of the structure at the location;

a computing device having a processor and memory and being connectable to the at least one sensor, the computing device comprising:

a data collection module to receive the output signal and store the output signal as measured data in memory;

a data processing module configured to separate the low amplitude data from high amplitude data in the measured data to allow for processing of the low amplitude data;

connect the low amplitude data to form continuous low amplitude time history data for detailed processing; and determine a dynamic response of the structure from the continuous low amplitude time history data, wherein determining the dynamic response includes determining one of a spectral response, a mode shape, and a non-linear damping characteristic, the data processing module further determining an as-is condition from one of the spectral response, mode shape and non-linear damping characteristic; and a risk ratio processor to determine a risk ratio of the structure by comparing the as-is condition with the as-designed condition, the risk ratio quantifying a risk of failure of the structure to withstand an event limit.

2. A system according to claim 1, wherein the data collection module stores the continuous low amplitude time history data.

3. A system according to claim 2, wherein the data processing module determines a spectral response applying a Fast Fourier Transform to the time history data.

4. A system according to claim 1, further comprising a plurality of sensors selectively placeable at a plurality of locations of the structure, each of the plurality of sensors generating an output signal indicative of movement of the structure at each of the plurality of locations, wherein determining the mode shape comprises comparing the output signal of each of the plurality of sensors at a first location, with the output signal of each of the plurality of sensors at a second location, the first and second location being one of vertically and horizontally separated.

5. A system according to claim 1, wherein the data collection module stores the output signal as time history data, and wherein the data processing module determines a non-linear damping characteristic using a random decrement method modified to consider a single mode of the time history data.

6. A system according to claim 1, wherein the system further comprises a plurality of sensors located at a plurality of locations of the structure, and wherein the data processing module determines a mode shape by determining a magnitude of movement of each of the plurality of sensors at each of the plurality of locations.

7. A system according to claim 1, further comprising a plurality of sensors.

8. A system according to claim 7, wherein one of the plurality of sensors comprises a reference sensor, and one of the plurality of sensors comprises a traveler sensor, the reference sensor being placed at a first location of the structure, and the traveler sensor being placed at a plurality of locations of the structure, wherein the data collection module receives the output signal from the reference sensor at the first location, and from the traveler sensor at each of the plurality of locations.

9. A system according to claim 1, wherein the at least one sensor comprises one of an accelerometer, a geophone, a strain gage, a geo-positioning system, and a displacement transducer.

10. A system according to claim 1, wherein the separating of low amplitude data from high amplitude data in the measured data includes identifying portions of the measured data that reflect the influence of forces and added mass.

11. A system according to claim 10, wherein the separating of low amplitude data from high amplitude data in the measured data includes removing the identified portions.

12. A system according to claim 1, wherein the data collection module comprises a data logger.

13. A system according to claim 1, wherein the risk ratio processor determines a risk ratio of the structure by comparing the as-is condition with the as-designed condition using the formula $$\frac{F_{rm}}{F_{rd}} = \frac{\zeta_{rd} f_{rd}^2}{\zeta_{rm} f_{rm}^2}$$

where $F_{rm}$ and $F_{rd}$ are, respectively, a displacement force experienced by the structure for the as-is and as-designed conditions, $\zeta_{rd}$ and $\zeta_{rm}$ are, respectively, the damping of mode r for the as-is and as-designed conditions, and $f_{rd}$ and $f_{rm}$ are, respectively, the resonant frequency for the as-is and as-designed conditions.

14. A system according to claim 1, wherein the data processing module further determines a displacement per unit force for the as-is condition using the formula $$\frac{X_{rm}}{F_{rm}} = \frac{1}{8 f_{rm}^2 \zeta_{rm} M_{rm} \pi^2}$$

where $X_{rm}$ is a displacement experienced by the structure, $F_{rm}$ is a displacement force experienced by the structure, $\zeta_{rm}$ is the damping of mode r, $f_{rm}$ is the resonant frequency, and M is the modal mass of the structure.

15. A system according to claim 1, wherein the data processing module further determines a displacement per unit force for the as-designed condition using the formula $$\frac{X_{rd}}{F_{rd}} = \frac{1}{8 f_{rd}^2 \zeta_{rd} M_{rd} \pi^2}$$

where $X_{rd}$ is a displacement experienced by the structure, $F_{rd}$ is a displacement force experienced by the structure, $\zeta_{rd}$ is the damping of mode r, $f_{rd}$ is the resonant frequency, and M is the modal mass of the structure.

16. A method for quantifying a risk of failure of a structure in response to an event or loading, the structure being designed to withstand an event not exceeding an event limit, the structure having an as-designed condition, the method being carried out by a system comprising:

at least one sensor placeable at a location of the structure and configured to detect movement of the structure at the location and to generate an output signal indicative of movement of the structure at the location;

a computing device having a processor and memory and being connectable to the at least one sensor, the computing device having a program of instruction stored in memory that, when executed, cause the processor to:

receive the output signal and store the output signal as measured data in memory;

separate low amplitude data from high amplitude data in the measured data to allow for processing of the low amplitude data;

connect the low amplitude data into a continuous time history for detailed processing;

connect the low amplitude data to form continuous low amplitude time history data for detailed processing;

determine a dynamic response of the structure from continuous low amplitude time history data, wherein determining the dynamic response includes determining one of a spectral response, a mode shape, and a non-linear damping characteristic, the data processing module further determining an as-is condition from one of the spectral response, mode shape and non-linear damping characteristic; and determine a risk ratio of the structure by comparing the as-is condition with the as-designed condition, the risk ratio quantifying a risk of failure of the structure to withstand an event limit.

17. A method according to claim 16, wherein the output signal comprises time series data, and wherein determining a spectral response further comprises applying a Fast Fourier Transform to the time series data.

18. A method according to claim 16, wherein the system further comprises a plurality of sensors selectively placeable at a plurality of locations of the structure, each of the plurality of sensors generating an output signal indicative of movement of the structure at each of the plurality of locations, wherein determining the mode shape comprises comparing the output signal of each of the plurality of sensors at a first location, with the output signal of each of the plurality of sensors at a second location, the first and second location being one of vertically and horizontally separated.

19. A method according to claim 16, wherein the output signal comprises time series data, and wherein determining a non-linear damping characteristic comprises using a random decrement method modified to consider a single mode of the time history data.

20. A method according to claim 16, wherein the system further comprises a plurality of sensors located at a plurality of locations of the structure, and wherein determining a mode shape comprises determining a magnitude of movement of each of the plurality of sensors at each of the plurality of locations.

21. A method according to claim 16, wherein the separating of low amplitude data from high amplitude data in the measured data includes identifying portions of the measured data that reflect the influence of forces and added mass.

22. A system according to claim 21, wherein the separating of low amplitude data from high amplitude data in the measured data includes removing the identified portions.

23. A method according to claim 16, wherein determining a risk ratio comprises comparing the as-is condition with the as-designed condition using the formula $$\frac{F_{rm}}{F_{rd}} = \frac{\zeta_{rd} f_{rd}^2}{\zeta_{rm} f_{rm}^2}$$

where $F_{rm}$ and $F_{rd}$ are, respectively, a displacement force experienced by the structure for the as-is and as-designed conditions, $\zeta_{rd}$ and $\zeta_{rm}$ are, respectively, the damping of mode r for the as-is and as-designed conditions, and $f_{rd}$ and $f_{rm}$ are, respectively, the resonant frequency for the as-is and as-designed conditions.

24. A method according to claim 16, further comprising the step of determining a displacement per unit force for the as-is condition using the formula $$\frac{X_{rm}}{F_{rm}} = \frac{1}{8 f_{rm}^2 \zeta_{rm} M_{rm} \pi^2}$$

where $X_{rm}$ is a displacement experienced by the structure, $F_{rm}$ is a displacement force experienced by the structure, $\zeta_{rm}$ is the damping of mode r, $f_{rm}$ is the resonant frequency, and M is the modal mass of the structure.

25. A method according to claim 16, further comprising the step of determining a displacement per unit force for the as-designed condition using the formula $$\frac{X_{rd}}{F_{rd}} = \frac{1}{8 f_{rd}^2 \zeta_{rd} M_{rd} \pi^2}$$

where $X_{rd}$ is a displacement experienced by the structure, $F_{rd}$ is a displacement force experienced by the structure, $\zeta_{rd}$ is the damping of mode r, $f_{rd}$ is the resonant frequency, and M is the modal mass of the structure.

* * * * *